United States Patent
Kim et al.

(10) Patent No.: US 11,627,383 B2
(45) Date of Patent: Apr. 11, 2023

(54) ELECTRONIC DEVICE AND OPERATION METHOD THEREOF

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Sunghyun Kim, Suwon-si (KR); Yongdeok Kim, Suwon-si (KR); Gunhee Kim, Seoul (KR); Joonil Na, Seoul (KR); Jinyoung Sung, Seoul (KR); Youngjae Yu, Seoul (KR); Sangho Lee, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 17/046,494

(22) PCT Filed: Mar. 27, 2019

(86) PCT No.: PCT/KR2019/003559
§ 371 (c)(1),
(2) Date: Oct. 9, 2020

(87) PCT Pub. No.: WO2019/198951
PCT Pub. Date: Oct. 17, 2019

(65) Prior Publication Data
US 2021/0136467 A1    May 6, 2021

(30) Foreign Application Priority Data
Apr. 10, 2018 (KR) .................. 10-2018-0041709

(51) Int. Cl.
*H04N 21/8549* (2011.01)
*G06F 16/55* (2019.01)
(Continued)

(52) U.S. Cl.
CPC ......... *H04N 21/8549* (2013.01); *G06F 16/55* (2019.01); *G06F 16/583* (2019.01);
(Continued)

(58) Field of Classification Search
CPC ................................................. H04N 21/8549
(Continued)

(56) References Cited

U.S. PATENT DOCUMENTS

| 7,559,015 B2 | 7/2009 | Munetsugu et al. |
| 2011/0169952 A1 | 7/2011 | Yamaguchi et al. |

(Continued)

FOREIGN PATENT DOCUMENTS

| CN | 102214304 | 10/2011 |
| CN | 104123396 | 7/2017 |

(Continued)

OTHER PUBLICATIONS

International Search Report dated Jul. 8, 2019 in International Application No. PCT/KR2019/003559 and English-language translation.

(Continued)

*Primary Examiner* — Daniel T Tekle

(57) ABSTRACT

Provided are an electronic device and an operation method thereof. The electronic device includes a memory that stores one or more instructions, and a processor that executes the one or more instructions stored in the memory, wherein the processor is configured to execute the one or more instructions to: divide original image data into a plurality of image sequences; determine a predetermined number of image sequences among the plurality of image sequences as an (Continued)

input image group, select one of the image sequences included in the input image group and add the selected image sequence to the highlight image group based on one or more image sequences pre-classified as a highlight image group, by using a trained model trained using an artificial intelligence algorithm; and generate summary image data extracted from the original image data, by using the image sequence included in the highlight image group.

13 Claims, 19 Drawing Sheets

(51) Int. Cl.
  *G06F 16/583* (2019.01)
  *G06F 16/58* (2019.01)
  *G06N 3/08* (2023.01)
  *H04N 21/8547* (2011.01)
(52) U.S. Cl.
  CPC ......... *G06F 16/5866* (2019.01); *G06N 3/08* (2013.01); *H04N 21/8547* (2013.01)
(58) Field of Classification Search
  USPC ........................................................ 386/241
  See application file for complete search history.

(56) References Cited

U.S. PATENT DOCUMENTS

2012/0057775 A1   3/2012   Suzuki et al.
2016/0070962 A1*  3/2016   Shetty ................ G06K 9/00718
                                              382/225
2017/0053170 A1*  2/2017   Rafati .................. G06F 16/739

FOREIGN PATENT DOCUMENTS

JP   2005-166063   6/2005
JP   2005-353006   12/2005
JP   2011-254342   12/2011
WO   2016/038522   3/2016

OTHER PUBLICATIONS

Written Opinion dated Jul. 8, 2019 in International Application No. PCT/KR2019/003559 and English-language translation.
Krizhevsky, Alex et al., "Imagenet classification with deep convolutional neural networks," Hinton, Dec. 2012, 9 pages.
Song, Y. et al., "TVSum: Summarizing Web Videos Using Titles," CVPR, Jun. 2015, 9 pages.
Sigurdsson, G. A. et al, "Learning Visual Storylines with Skipping Recurrent Neural Networks," ECCV, Jul. 2016, 18 pages.
Goodfellow, Ian et al., "Deep Learning," MIT Press, Oct. 2017, 3 pages.
Anonymous, "A Memory Network Approach for Story-based Temporal Summarization of 360 Videos," CPVR May 2018, 10 pages.
Notice of Non-Final Rejection dated Feb. 17, 2022 in Korean Patent Application No. 10-2018-0041709 and English-language translation.
Notice of Allowance dated Aug. 3, 2022 in counterpart Korean Patent Application No. 10-2018-0041709 and English-language translation.

* cited by examiner

ELECTRONIC DEVICE AND OPERATION METHOD THEREOF

This application is the U.S. national phase of International Application No. PCT/KR2019/003559 filed Mar. 27, 2019 which designated the U.S. and claims priority to KR Patent Application No. 10-2018-0041709 filed Apr. 10, 2018, the entire contents of each of which are hereby incorporated by reference.

TECHNICAL FIELD

Various embodiments relate to an electronic device and an operation method thereof, and more particularly, to an electronic device generating summary image data from original image data and a method of operating the same.

BACKGROUND ART

A display device is a device having a function of displaying an image that a user can watch. A user may view a broadcast through a display device. The display device displays a broadcast, which is selected by the user from among broadcast signals transmitted from a broadcast station, on a display. Currently, broadcasting has been changed worldwide from analog broadcasting to digital broadcasting.

Digital broadcasting refers to broadcasting digital images and audio signals. Compared with analog broadcasting, digital broadcasting is strong against external noise and has small data loss, is advantageous for error correction, has high resolution, and provides clear images. Also, unlike analog broadcasting, digital broadcasting can provide a bidirectional service.

Also, provided is a smart television (TV) providing various pieces of content in addition to a digital broadcasting function. The smart television is capable of analyzing and providing what a user desires without a user's operation, rather than being manually operated according to a user's selection.

Recently, research on a method of automatically summarizing a vast amount of image data and providing summarized image data to a user is required.

SUMMARY

The present disclosure provides an electronic device for automatically summarizing image data and a method of operating the same.

The technical problems to be achieved by the present invention are not limited to the technical problems mentioned above, and other technical problems that are not mentioned can be clearly understood by one of ordinary skill in the art from the following description.

An electronic device according to an aspect includes a memory that stores one or more instructions, and a processor that executes one or more instructions stored in the memory, wherein the processor is configured to execute the instructions to: divide original image data into a plurality of image sequences, determine a predetermined number of image sequences among the plurality of image sequences as an input image group, select one of the image sequences included in the input image group and add the selected image sequence to the highlight image group based on one or more image sequences pre-classified as a highlight image group using a trained model trained using an artificial intelligence algorithm, and generate summary image data extracted from the original image data using the image sequence included in the highlight image group.

An operation method of an electronic device according to an aspect may include dividing original image data into a plurality of image sequences, determining a predetermined number of image sequences among the plurality of image sequences as an input image group, selecting one of the image sequences included in the input image group based on one or more image sequences pre-classified as a highlight image group using a trained model trained using an artificial intelligence algorithm and adding the selected image sequence to the highlight image group, and generating summary image data extracted from the original image data using the image sequence included in the highlight image group.

A computer-readable recording medium according to another aspect includes a recording medium having recorded thereon a program which, when executed by a computer, performs the above-described method.

DETAILED DESCRIPTION OF EXAMPLE EMBODIMENTS

Figure 1:
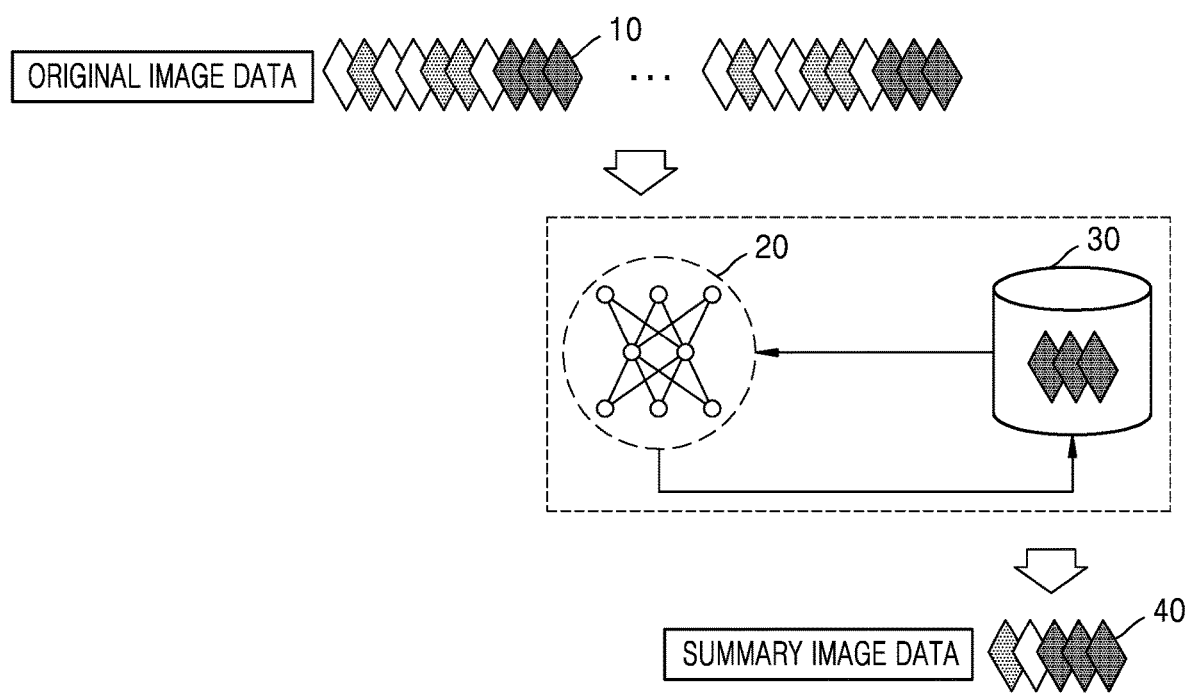
FIG. 1 is a view for schematically explaining an embodiment.

Reference will now be made in detail to embodiments, examples of which are illustrated in the accompanying drawings. In this regard, the present disclosure may have different forms and should not be construed as being limited to the descriptions set forth herein. In addition, descriptions of well-known functions and constructions will be omitted for clarity and conciseness, and similar reference numerals are assigned to similar elements throughout the specification.

General and widely used terms have been employed herein, in consideration of functions provided in the present disclosure, and may vary according to an intention of one of ordinary skill in the art, a precedent, or emergence of new technologies. Accordingly, it will be understood that the terms used herein should be interpreted as having a meaning that is consistent with their meaning in the context of the relevant art and will not be interpreted in an idealized or overly formal sense unless expressly so defined herein.

It will be understood that, although the terms first, second, etc. may be used herein to describe various elements, these elements should not be limited by these terms. These components are only used to distinguish one component from another.

Furthermore, the terms used in the present disclosure will only been used for the purpose of describing particular embodiments, and are not used with intent to limit the present disclosure. As used herein, the singular forms "a", "an", and "the" are intended to include the plural forms as well, unless the context clearly indicates otherwise. Throughout the specification, it will be understood that when a unit is referred to as being "connected" to another element, it may be "directly connected" to the other element or "electrically connected" to the other element in a state in which intervening elements are present. In addition, it will be understood that when a unit is referred to as "comprising" another element, it may not exclude the other element but may further include the other element unless specifically oppositely indicates.

The use of the terms "a", "an", and "the" and similar referents in the context of describing the specification (especially in the context of the following claims) are to be construed to cover both the singular and the plural. Also, the steps of all methods described herein can be performed in any suitable order unless otherwise indicated herein or otherwise clearly contradicted by context. The present disclosure is not limited to the described order of the steps.

Phrases such as "in some example embodiments" or "in an example embodiment" appearing in various places in the specification are not necessarily all referring to the same example embodiment.

Some embodiments of the present disclosure may be represented by the functional block configurations and various processing steps. Some or all of these functional blocks may be implemented in hardware and/or software configuration of the various number of executing a particular function. For example, the functional blocks of the present disclosure may be implemented by one or more microprocessors, or by circuit configurations for a predetermined function. Also, for example, the functional blocks of the present disclosure may be implemented in various programming or scripting languages. Functional blocks may be realized by algorithms executed in more than one processor. In addition, the present disclosure may adopt related-art technology for electronic environment set-up, signal processing, and/or data processing, etc. Terms such as "factor", "element", "unit" and "formation" may be widely used, and not limited to mechanical and physical formations.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

Hereinafter, the present disclosure will be described in detail with reference to the accompanying drawings.

FIG. 1 is a view for schematically explaining an embodiment.

According to an embodiment, an electronic device 100 (of FIGS. 2 and 3) (hereinafter, the electronic device 100) may generate summary image data by automatically summarizing original image data. For example, the electronic device 100 may generate summary image data having a reproduction time of 5 minutes, extracting only the main scenes from original image data having a reproduction time of 60 minutes.

According to an embodiment of the present disclosure, the electronic device 100 may generate summary image data extracted from input original image data using a trained model 20 trained using an artificial intelligence algorithm. A trained model according to an embodiment may be a model that learns vast data about a set of an original image and a summary image produced by a person or a predetermined algorithm.

The trained model may be constructed considering the application field of the trained model, the purpose of learning, or computer performance of the device. The trained model may be, for example, a model based on a neural network. For example, a model such as a Recurrent Neural Network (RNN), a Deep Neural Network (DNN), and Bidirectional Recurrent Deep Neural Network (BRDNN) may be used as a trained model, but the present disclosure is not limited thereto.

Referring to FIG. 1, the electronic device 100 according to an embodiment may divide original image data 10 into a plurality of image sequences (e.g., image sequences in units of 1 minute). The electronic device 100 may select one or more image sequences including important scenes to be generated as summary image data 40 from among the plurality of image sequences.

According to an embodiment, the electronic device 100 may select one image sequence including an important scene to be included in a summary image from among the plurality of image sequences, and may repeat the step of storing the selected image sequence in a memory area 30 (a highlight image group in FIGS. 4 and 5) multiple times. At this time, the electronic device 100 may select, for each step, an image sequence to be added to the memory area 30 considering a correlation with an image sequence previously stored in the memory area 30.

The electronic device 100 may repeat the step of selecting an image sequence one by one until a reproduction time of the combination of one or more image sequences stored in the memory area 30 reaches a target time (e.g., 5 minutes) of preset summary image data.

The electronic device 100 according to an embodiment may generate the summary image data 40 by combining image sequences stored in the memory area 30.

According to an embodiment, whenever an image sequence to be included in the summary image data 40 is selected, the electronic device 100 may generate summary image data in which important scenes are more naturally connected to each other by considering a correlation with an image sequence previously stored in the memory area 30. For example, the correlation may mean that the plot is connected when considering scenarios, themes, and the like of a video, or may include common objects, characters, and backgrounds, but is not limited thereto.

According to an embodiment, image data may include 2D video and 360-degree video, but is not limited thereto.

According to an embodiment, the electronic device 100 may extract a plurality of feature points from an image frame constituting image data. The electronic device 100 may convert the image data into vector data using the feature points extracted from the image frame. The electronic device 100 may select an image sequence to be classified into a highlight image group (memory area 30) by determining vector data having a high score using a predetermined arithmetic expression.

A method of generating summary image data by the electronic device 100 according to an embodiment will be described in more detail in the description of FIGS. 5 to 9 to be described later below.

Meanwhile, the electronic device 100 (of FIGS. 2 and 3) (hereinafter, the electronic device 100) according to an embodiment may be implemented as a device including a display 110 (of FIG. 3).

The electronic device 100 according to an embodiment may be a TV, but is not limited thereto. For example, the electronic device 100 may be implemented with various electronic devices, such as a desktop computer, a tablet personal computer (PC), a laptop computer, a mobile phone, an e-book terminal, a digital broadcasting terminal, personal digital assistants (PDAs), a portable multimedia player (PMP), a navigation, a digital camera, a camcorder, an MP3 player, and a wearable device. In addition, the electronic device 100 may be a fixed type or a mobile type, and may also be a digital broadcasting receiver capable of receiving digital broadcasting.

Furthermore, the electronic device 100 according to an embodiment may be implemented not only as a flat display device but also as a curved display device having a screen with a curvature or a flexible display device capable of adjusting a curvature. An output resolution of the electronic device 100 may be, for example, High Definition (HD) resolution, Full HD resolution, Ultra HD resolution, or higher resolution than the Ultra HD.

FIG. 1 is a view for explaining an embodiment, but the present disclosure is not limited thereto.

Figure 2:
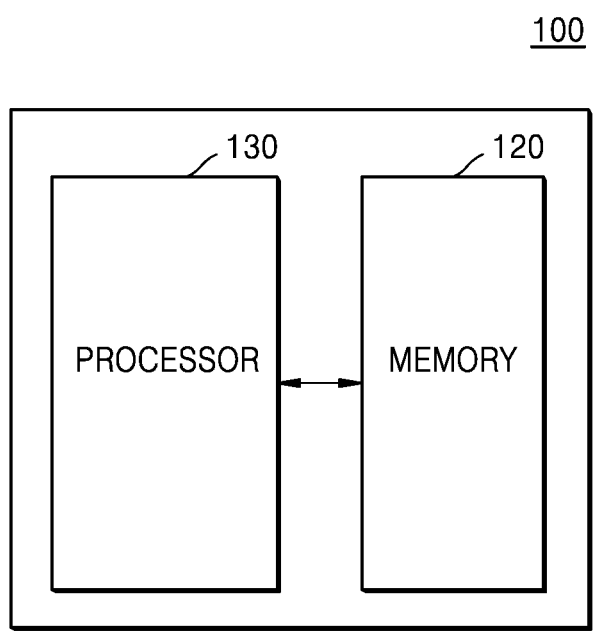
FIGS. 2 and 3 are block diagrams of an electronic device according to an embodiment.
Figure 3:
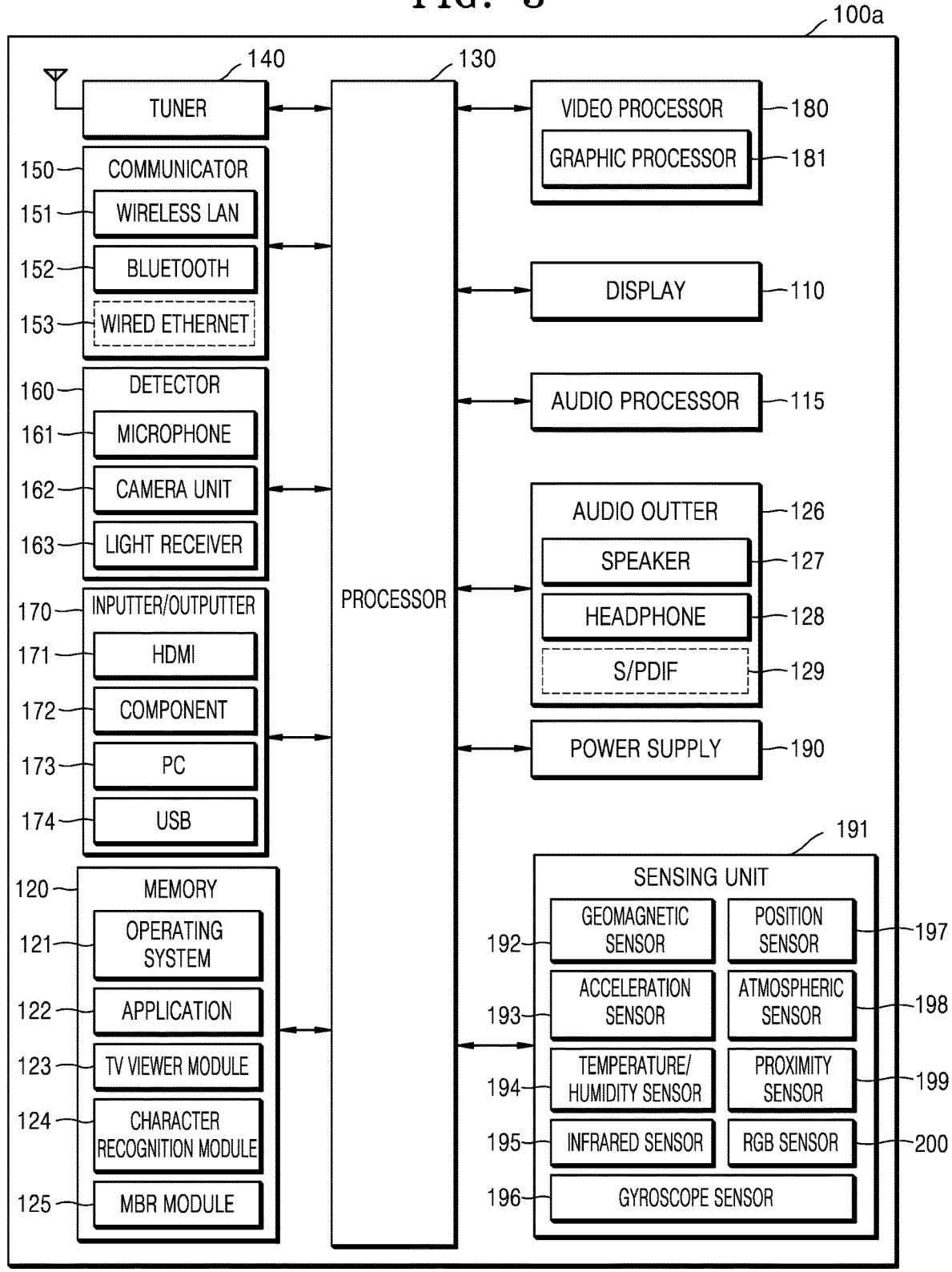

FIGS. 2 and 3 are block diagrams of an image display device according to an embodiment.

As illustrated in FIG. 2, the electronic device 100 according to an embodiment may include a memory 120 and a processor 130. However, the elements, shown in FIG. 2, are not essential elements. An image display device 100 may be implemented by using more or less elements than those shown in FIG. 2.

For example, as illustrated in FIG. 3, the image display device 100 according to an embodiment may further include a display 110, a tuner 140, a communicator 150, a detector 160, an input/output unit 170, a video processor 180, an audio processor 115, an audio output unit 126, a power source 190, and a sensor 191 in addition to the memory 120 and the processor 130.

An electronic device 100a of FIG. 3 may be an embodiment of the electronic device 100 of FIGS. 1 and 2.

Hereinafter, the elements will be described.

The processor 130 controls all operations of the electronic device 100 and a signal flow between internal components of the electronic device 100 and performs data processing. The processor 130 may execute an operating system (OS) and various applications stored in the memory 120 when the processor 130 receives a user input or satisfies conditions already set and stored.

The processor 130 may store signals or data input from the outside of the electronic device 100 or may include random access memory (RAM) used as a storage area corresponding to various operations performed in the electronic device 100, read only memory (ROM) in which a control program for controlling the electronic device 100 is stored, and a processor.

The processor 483 may include a graphics processing unit (GPU) (not shown) for graphics processing corresponding to a video. The processor 130 may be implemented as a system on chip (SoC) integrating a core (not shown) and the GPU (not shown). The controller 130 may include a single core, a dual core, a triple core, a quad core, and multiples thereof.

Furthermore, the processor 130 may include a plurality of processors. For example, the processor may be implemented as a main processor (not shown) and a sub processor (not shown) operating in a sleep mode.

According to an embodiment, the processor 130 may divide original image data into a plurality of image sequences by executing one or more instructions stored in the memory 120. According to an embodiment, the processor 130 may divide original image data into the plurality of image sequences based on a predetermined time unit by executing one or more instructions stored in the memory 120.

In addition, according to an embodiment, the processor 130 may determine a predetermined number of image sequences among a plurality of image sequences as an input image group by executing one or more instructions stored in the memory 120.

In addition, according to an embodiment, the processor 130 may determine the predetermined number of image sequences arranged adjacent to each other in a reproduction time order among the plurality of divided image sequences as an input image group by executing one or more instructions stored in the memory 120.

Furthermore, according to an embodiment, the processor 130, by executing one or more instructions stored in the memory 120, may determine a predetermined number of image sequences from a second image sequence arranged adjacent to a first image sequence in a reproduction time order as a second input image group when the first image sequence among a plurality of image sequences included in a first input image group is added to a highlight image group.

In addition, according to an embodiment, the processor 130 may determine a target time of summary image data based on a user input by executing one or more instructions stored in the memory 120.

In addition, according to an embodiment, the processor 130, by executing one or more instructions stored in the memory 120, may select one of image sequences included in an input image group and add the selected image sequence to a highlight image group based on one or more image sequences pre-classified as the highlight image group using a trained model trained using an artificial intelligence algorithm.

In addition, according to an embodiment, the processor 130, by executing one or more instructions stored in the memory 120, may select an image sequence to be added to the highlight image group multiple times based on the target time.

In addition, according to an embodiment, the processor 130, by executing one or more instructions stored in the memory 120, may generate summary image data extracted from original image data using an image sequence included in the highlight image group.

In addition, according to an embodiment, the processor 130, by executing one or more instructions stored in the memory 120, may control the display 110 to display the generated summary image data as a thumbnail image.

The memory 120 may store various data, programs, or applications for driving and controlling the mobile device 100 under the control of the processor 130. The memory 120 may store input/output signals or data corresponding to driving of the video processor 180, the display 110, the audio processor 115, the audio output unit 126, the power source 190, the tuner 140, the communicator 150, the detector 160, and the input/output unit 170.

The memory 120 may store an operating system 121 for controlling the electronic device 100 and processor 130, an application 122 initially provided from a manufacturer or downloaded from the outside, a graphical user interface (GUI) related to the application, objects (e.g., images, texts, icons, buttons, etc.) for providing the GUI, user information, documents, databases, or related data.

In addition, the memory 120 may include a TV viewer module 123 that receives an input signal from a remote control device (not shown) and performs channel control corresponding to the input signal accordingly or includes one or more instructions for entering a channel-scrolling user interface mode when the input signal corresponds to a predetermined input, a character recognition module 124 including one or more instructions for recognizing information from content received from an external device (not shown), and an MBR module 125 including one or more instructions for channel control from an external device (not shown).

The memory 120 includes a memory card (e.g., a micro secure digital (SD) card, a universal serial bus (USB) memory; not shown) mounted in ROM, RAM, or the electronic device 100. In addition, the memory 200 may include a nonvolatile memory, a volatile memory, a hard disk drive (HDD), or a solid state drive (SSD).

According to an embodiment, the memory 120 may include at least one type of storage medium from among memory of a flash memory type, a hard disk type, a multimedia card micro type or a card type (e.g., SD or XD memory), RAM, static RAM, ROM, electrically erasable programmable ROM (EEPROM), programmable ROM (PROM), magnetic memory, a magnetic disk, or an optical disk.

According to an embodiment, the memory 120 may store original image data.

According to an embodiment, the memory 120 may classify each of a plurality of image sequences obtained by dividing the original image data into an input image group and a highlight image group and store them in different memory areas.

Also, according to an embodiment, the memory 120 may store generated summary image data.

The display 110 displays a video included in a broadcast signal received through the tuner 140 (of FIG. 3) on a screen under the control of the processor 130. In addition, the display 360 may display content (e.g., a video) input through the communicator 150 or the input/output unit 170. The display 110 may output an image stored in the memory 120 under the control of the processor 210.

The display 110 converts an image signal, a data signal, an on-screen display (OSD) signal, a control signal, etc. processed in the processor 130 to generate a driving signal. The display 110 may be implemented as a plasma display panel (PDP), a liquid crystal display (LCD), an organic light emitting diode (OLED), a flexible display, or the like, and may also be implemented as a three-dimensional (3D) display. Also, the display 110 may be configured as a touch screen and used as an input device in addition to an output device.

According to an embodiment, the display 110 of the electronic device 100 may be implemented as a PDP, an LCD, an OLED, a cathode ray tube (CRT), or the like.

According to an embodiment, the display 110 may display original image data.

Further, according to an embodiment, the display 110 may display a user interface requesting user input required to generate summary image data from the original image data.

Further, according to an embodiment, the display 110 may display generated summary image data.

The tuner 140 may select only a frequency of a channel to be received from the electronic device 100 from among many electric wave components by tuning the frequency through amplification, mixing, resonance, etc. of a broadcast signal received in a wired or wireless manner. The broadcast signal includes audio, video and additional information (e.g., an electronic program guide (EPG)).

The tuner 140 may receive a broadcast signal in a frequency band corresponding to a channel number according to a user's input (e.g., an input of a control signal received from a remote control device (not shown) such as a channel number input, an up-down input of channels, and a channel input from an EPG display).

The tuner 140 may receive broadcast signals from various sources such as terrestrial broadcast, cable broadcast, satellite broadcast, Internet broadcast, and the like. The tuner 140 may receive a broadcast signal from a source such as an analog broadcast or a digital broadcast. The broadcast signal received through the tuner 140 is decoded (e.g., audio decoding, video decoding, or additional information decoding) and separated into audio, video and/or additional information. The separated audio, video and/or additional information may be stored in the memory 300 under the control of the processor 130.

The tuner 140 of the electronic device 100 may be one or more. The tuner 440 may be integrated with the electronic device 100 or may be implemented as a separate device (e.g., a set-top box (not shown)) having a tuner electrically connected to the electronic device 100, or a tuner (not shown) connected to the input/output unit 170.

The communicator 150 may connect the electronic device 100 to an external device (e.g., an audio device) under the control of the processor 130. The processor 130 may transmit/receive content to/from an external device (not shown) connected through the communicator 150, download an application from the external device (not shown), or perform web browsing. The communicator 150 may include one of a wireless LAN 151, a Bluetooth 152, and a wired Ethernet 153 corresponding to performance and a structure of the electronic device 100. The communicator 150 may include a combination of the wireless LAN 151, the Bluetooth 152, and the wired Ethernet 153.

The communicator 150 may receive a control signal of a remote control device (not shown) under the control of the processor 130. The control signal may be a Bluetooth type, a radio frequency (RF) signal type, or a WiFi type.

The communicator 150 may further include short-range communication (e.g., near field communication (NFC) (not shown), and Bluetooth low energy (BLE (not shown)) other than the Bluetooth.

The detector 160 may include a microphone 161, a camera 162, and an optical receiver 163, and may detect user's voice, a user's image, or a user's interaction.

The microphone 161 receives user's utterance. The microphone 161 may convert the received utterance into an electrical signal and output the electrical signal to the processor 130. The user's voice may include, for example, voice corresponding to a menu or a function of the electronic device 100.

The camera 162 may obtain an image frame such as a still image or a moving image. An image that is captured through the image sensor may be processed by the processor 130 or a separate image processing unit (not shown).

The image frame that is processed by the camera 1610 may be stored in a memory 1200 or may be transmitted to the outside through the communicator 1500. According to a configuration of the electronic device 100, two or more cameras 162 may be arranged.

The optical receiver 163 receives an optical signal (including a control signal) received from an external remote control device (not shown). The optical receiver 163 may receive an optical signal corresponding to a user input (e.g., touch, press, touch gesture, voice, or motion) from the remote control device (not shown). A control signal may be extracted from the received optical signal under the control of the processor 130. For example, the optical receiver 163 may receive a control signal corresponding to a channel up/down button for channel switching from a remote control device (not shown).

The input/output unit 170 receives video (e.g., a moving image, etc.), audio (e.g., an audio signal, music, etc.), and additional information (e.g., an EPG, etc.) from the outside of the electronic device 100 under the control of the processor 130. The input/output unit 170 may include at least one of a high-definition multimedia interface (HDMI) port 171, a component jack 172, a PC port 173, and a USB port 174. The input/output unit 170 may include a combination of at least one of the HDMI port 171, the component jack 172, the PC port 173, and the USB port 174. An external image providing device (not shown) may be connected to the input/output unit 170 through the HDMI port 171.

The video processor 180 performs processing on video data received by the electronic device 100. The video processor 180 may perform various types of image processing, such as decoding, scaling, noise filtering, frame rate conversion, or a resolution conversion, on the video data.

A graphics processor 181 generates a screen including various objects such as an icon, an image, and a text using a calculator (not shown) and a renderer (not shown). The calculator (not shown) calculates attribute values such as a coordinate value, a shape, a size, or a color with respect to each object according to a layout of the screen by using a user input detected through the detector 160. The renderer (not shown) generates a screen of various layouts including objects based on the attribute values calculated by the calculator (not shown). The screen generated by the renderer (not shown) is displayed in a display area of the display 110.

The audio processor 115 performs processing for audio data. The audio processor 115 may perform various processing, such as decoding, amplification, or noise filtering, on the audio data. Meanwhile, the audio processor 415 may include a plurality of audio processing modules for processing audio corresponding to pieces of content.

The audio output unit 126 outputs audio included in a broadcast signal received through the tuner 140 under the control of the processor 130. The audio output unit 126 may output audio (e.g., voice, sound) input through the communicator 150 or the input/output unit 170. The audio output unit 126 may output audio stored in the memory 120 under the control of the processor 130. The audio output unit 126 may include at least one of a speaker 127, a headphone output terminal 128, and a Sony/Philips digital interface (S/PDIF) output terminal 129. The audio output unit 126 may include at least one combination of the speaker 127, the headphone output terminal 128, and the S/PDIF output terminal 129.

The power source 190 supplies power input from an external power source to internal components of the electronic device 100 under the control of the processor 130. The power source 190 may supply power output from one or more batteries (not shown) located in the electronic device 100 to the internal components under the control of the processor 130.

The sensor 191 may sense a state of the electronic device 100 or a state around the electronic device 100 and may transmit sensed information to the processor 1300.

The sensor 191 may include, but is not limited to, at least one of a magnetic sensor 192, an acceleration sensor 193, a temperature/humidity sensor 194, an infrared sensor 195, a gyroscope sensor 196, a position sensor (e.g., GPS) 1970, an air pressure sensor 198, a proximity sensor 199, and an RGB sensor (i.e., a luminance sensor) 200. Functions of the sensors may be intuitionally deduced by one of ordinary skill in the art by referring to names of the sensors, and thus, detailed descriptions thereof will not be given herein.

Also, the electronic device 100 including the display 110 may be electrically connected to a separate external device (e.g., a set-top box, not shown) including the tuner 140.

Furthermore, the electronic device 100 may be implemented as an analog TV, a digital TV, a 3D TV, a smart TV, an LED TV, an OLED TV, a plasma TV, a monitor, or the like, but is not limited thereto. This will be easily understood by one of ordinary skill in the art.

Meanwhile, the block diagrams of the illustrated electronic devices 100 and 100*a* are block diagrams for an embodiment. Each component of the block diagram may be integrated, added, or omitted depending on the specification of the electronic device 100 that is actually implemented. For example, if necessary, two or more components may be combined into one component, or one component may be divided into two or more components. In addition, the functions performed by the respective blocks are for purposes of describing the embodiments, that the specific operation and the device shall not limit the scope of the invention.

Figure 4:
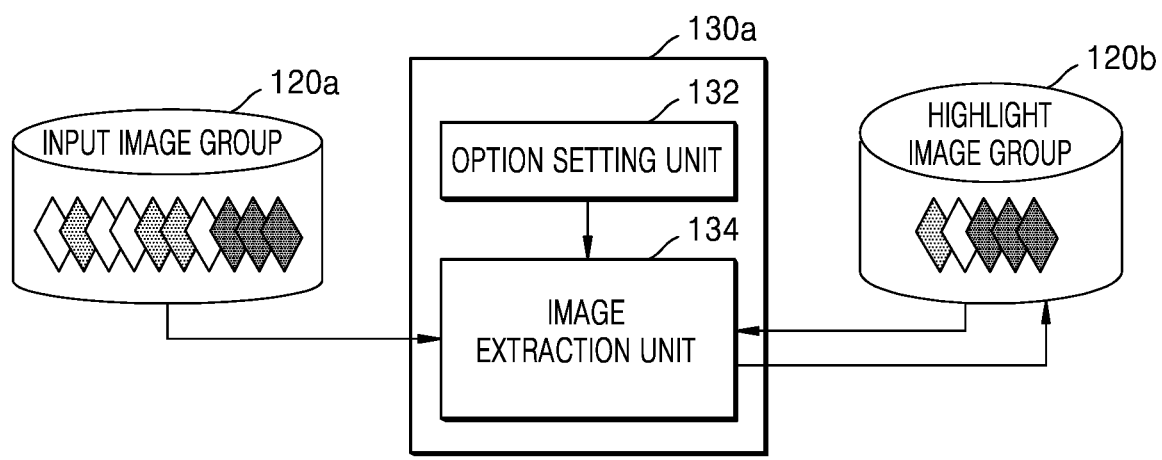
FIG. 4 is a block diagram of a processor according to an embodiment.

FIG. 4 is a block diagram of a processor according to an embodiment.

A processor 130*a* of FIG. 4 may be an embodiment of the processor 130 of FIGS. 2 and 3.

The processor 130*a* according to an embodiment may include an option setting unit 132 and an image extraction unit 134.

According to an embodiment, the option setting unit 132 may set or change a target time of summary image data. According to an embodiment, the option setting unit 132 may set a target time of a predetermined time as a default. Also, the option setting unit 132 may set or change the target time based on a user input.

Furthermore, according to an embodiment, the option setting unit 132 may set or change an option as to whether to select a summary image sequence evenly over the entire section of original image data.

Also, according to an embodiment, the option setting unit 132 may set or change options related to section information.

According to an embodiment, the option setting unit 132 may set or change the number of sections for dividing the original image data and a time point of each section. According to an embodiment, the option setting unit 132 may set the number of predetermined sections as a default.

In addition, the option setting unit 132 may set a predetermined time point as a default. In addition, the option setting unit 132 may set or change the number of sections and/or the time point of each section based on a user input.

Also, according to an embodiment, the option setting unit 132 may set or change the unit time of an image sequence.

According to an embodiment, the option setting unit 132 may set or change a unit time for dividing the original image data based on a user input. According to an embodiment, the option setting unit 132 may set a predetermined unit time as a default. Also, the option setting unit 132 may set or change a unit time for dividing the original image data based on a user input.

Also, according to an embodiment, the option setting unit 132 may set or change the number of input image sequences to be included in an input image group 120a.

Also, according to an embodiment, the option setting unit 132 may set or change the number of input image sequences to be included in a first input image group.

According to an embodiment, the image extraction unit 134 may select one of image sequences included in the input image group 120a and add the selected image sequence to a highlight image group 120b based on one or more image sequences pre-classified as the highlight image group 120b using a trained model trained using an artificial intelligence algorithm.

Also, according to an embodiment, the image extraction unit 134 may select one of image sequences included in the input image group 120a and add the selected image sequence to the highlight image group 120b based on section information corresponding to each image sequence included in the input image group 120a.

The block diagram of the processor 130a of FIG. 4 is a block diagram for an embodiment. The processor 130a is not limited to the option setting unit 132 and the image extraction unit 134 shown as components of the block diagram, and may be integrated, added, or omitted according to specifications of the electronic device 100 that is actually implemented. For example, if necessary, two or more components may be combined into one component, or one component may be divided into two or more components. Also, some components may be implemented as an external device (not shown) connectable to the electronic device 100.

FIGS. 1 to 4 illustrate an embodiment, but are not limited thereto.

Figure 5:
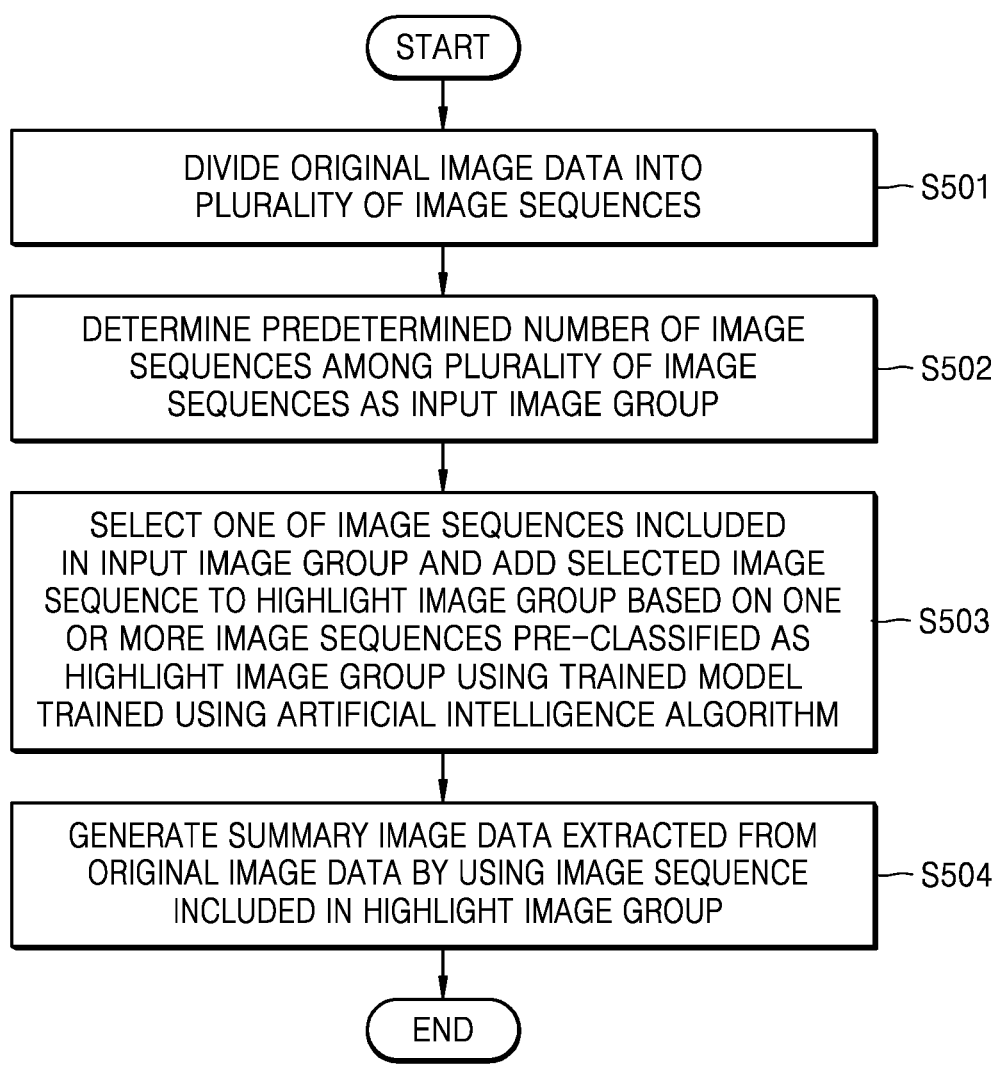
FIG. 5 is a flowchart of an operation method of an electronic device, according to an embodiment.
Figure 6:
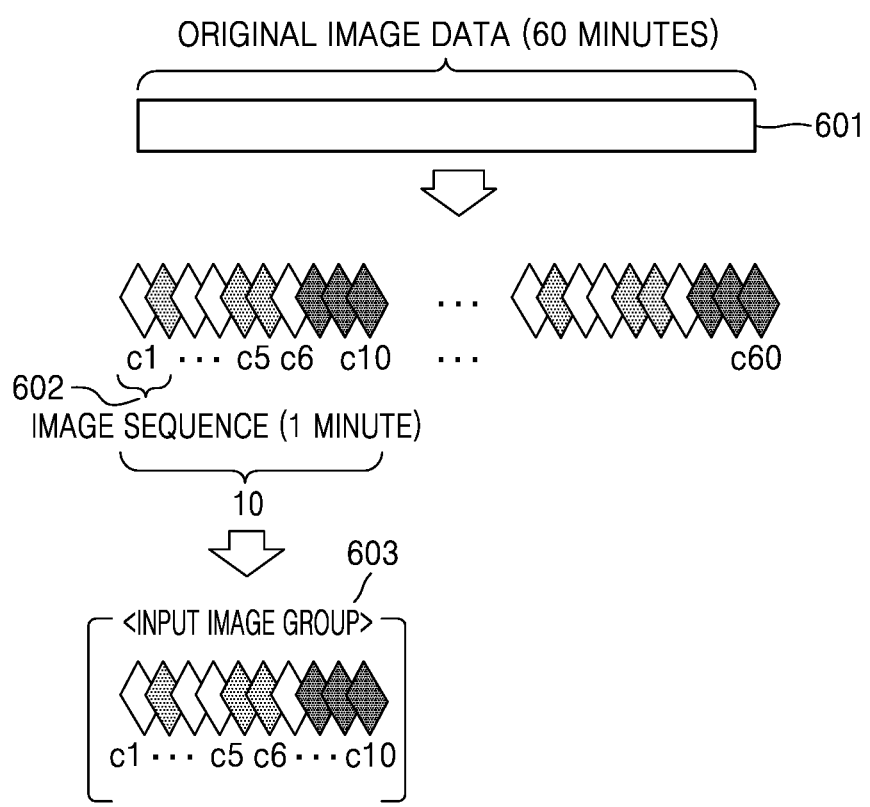
FIGS. 6 and 7 are views illustrating an example of determining an input image, according to an embodiment.
Figure 7:
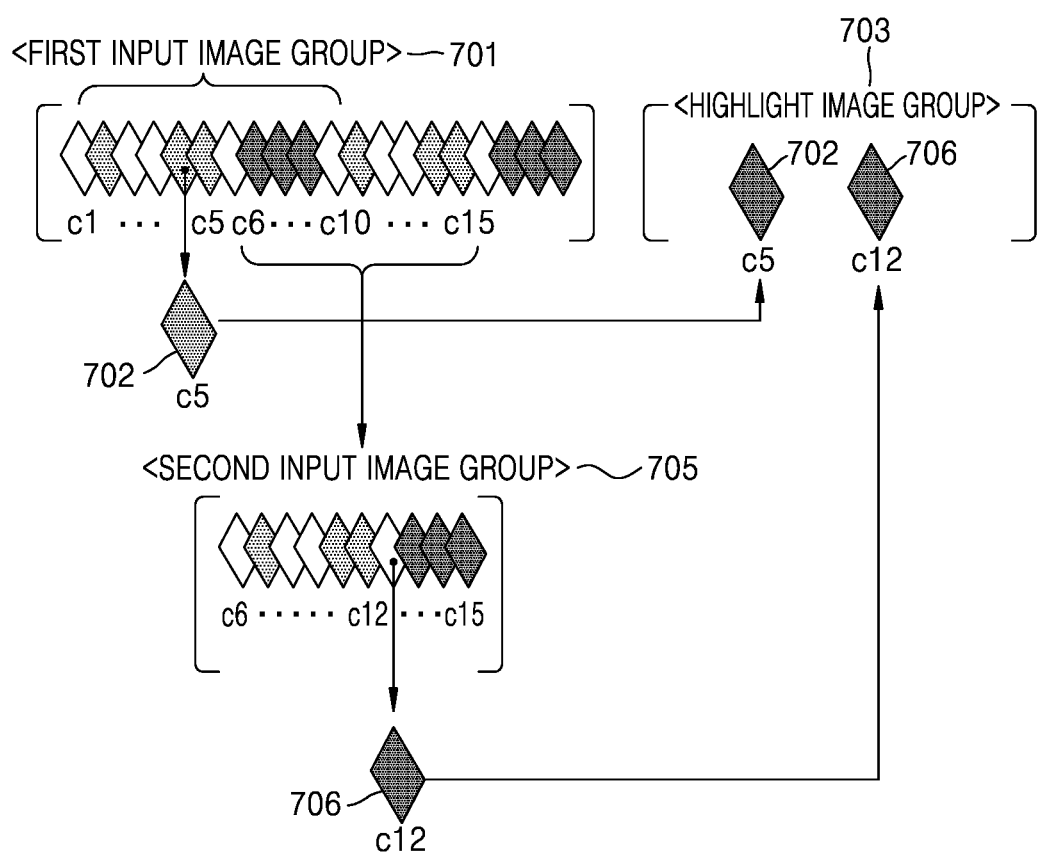
Figure 8:
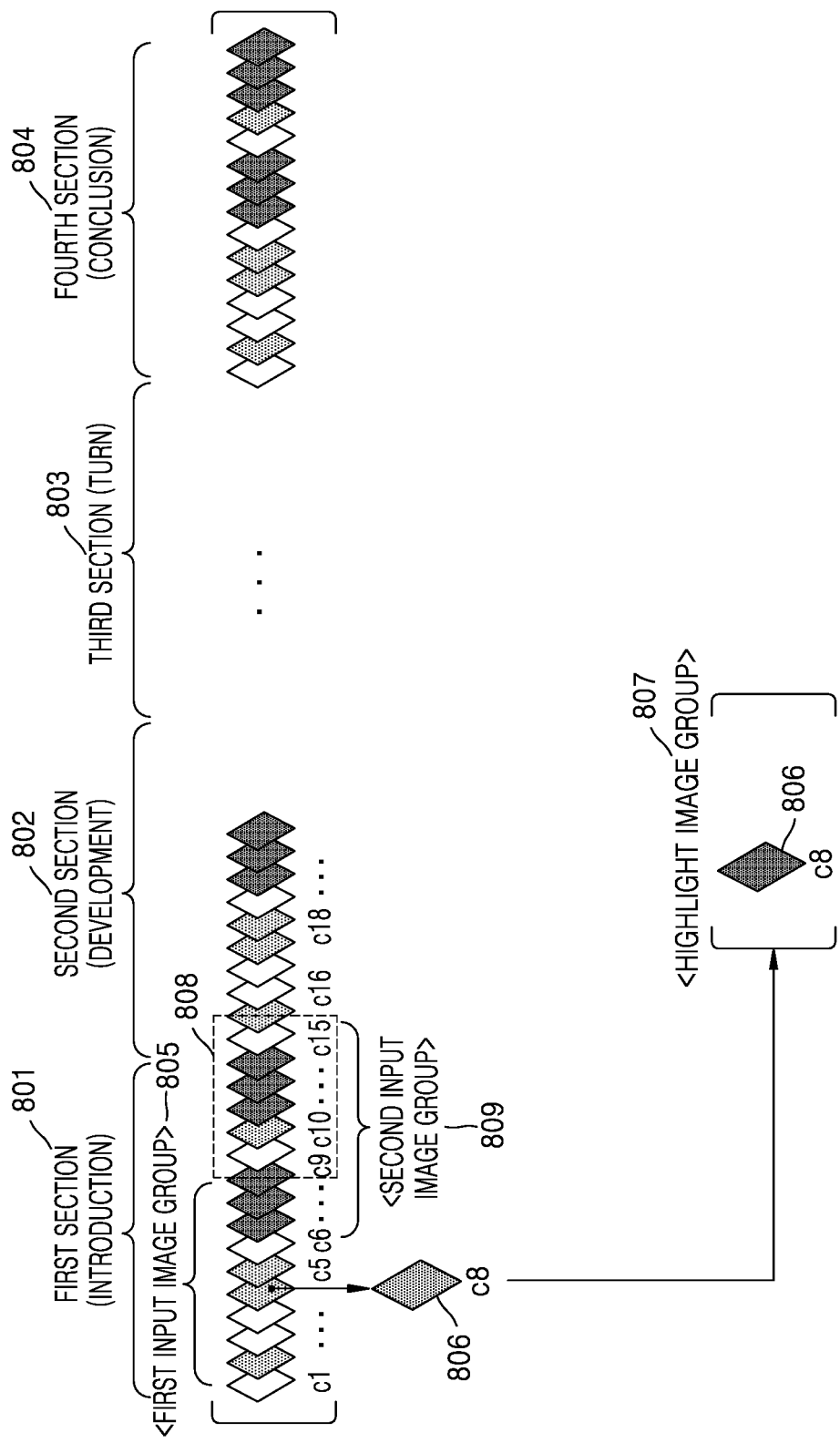
FIG. 8 is a view for explaining an example of selecting an image sequence to be added to a highlight image group based on section information, according to an embodiment.
Figure 9:
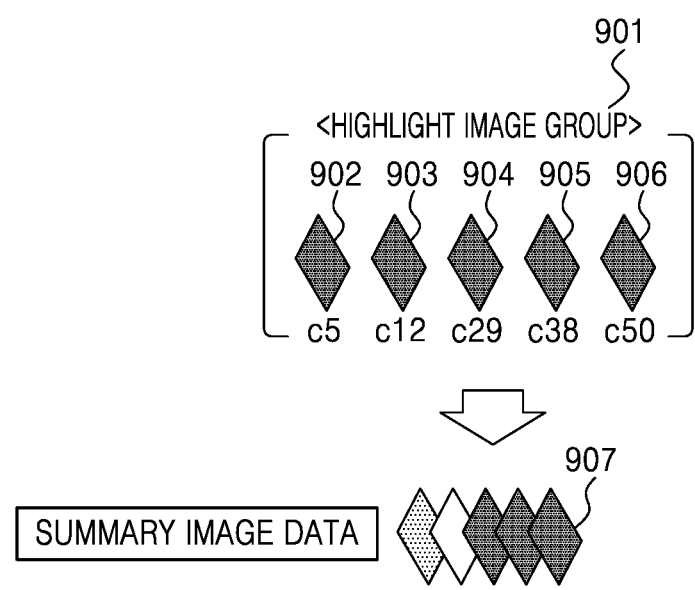
FIG. 9 is a view for explaining an example of generating summary image data, according to an embodiment.

FIG. 5 is a flowchart of an operation method of an electronic device according to an embodiment. FIGS. 6 and 7 are views illustrating an example of determining an input image according to an embodiment; FIG. 8 is a view for explaining an example of selecting an image sequence to be added to a highlight image group based on section information according to an embodiment. FIG. 9 is a view for explaining an example of generating summary image data according to an embodiment. The flowchart of FIG. 5 will be described with reference to the drawings of FIGS. 6 to 9.

In operation S501 of FIG. 5, the electronic device 100 according to an embodiment may divide original image data into a plurality of image sequences.

The electronic device 100 according to an embodiment may divide the original image data into a plurality of image sequences based on a predetermined time unit.

According to an embodiment, the electronic device 100 may set or change a unit time for dividing the original image data. According to an embodiment, the electronic device 100 may divide the original image data into a plurality of image sequences based on a unit time set as a default. Also, the electronic device 100 may set or change a unit time for dividing the original image data based on a user input.

Referring to FIG. 6, for example, the electronic device 100 may divide original image data 601 having a reproduction time of 60 minutes into an image sequence 602 in units of 1 minute. That is, the original image data having a reproduction time of 60 minutes may be divided into 60 image sequences in units of 1 minute (e.g., c1 to c60).

In operation S502 of FIG. 5, the electronic device 100 according to an embodiment may determine a predetermined number of image sequences among a plurality of image sequences as an input image group.

The electronic device 100 according to an embodiment may divide the original image data into a plurality of image sequences based on a predetermined time unit, and may determine a predetermined number of image sequences arranged adjacent to each other in a reproduction time order among the plurality of divided image sequences as an input image group.

The 'input image group' according to an embodiment refers to a set of a plurality of image sequences arranged in a time sequence to receive and process at once when a processor analyzes each image sequence and determines whether to include the image sequence in the summary image data.

According to an embodiment, the electronic device 100 may set or change the number of image sequences of the input image group. According to an embodiment, the electronic device 100 may determine the input image group based on the number of input image sequences set as a default. Also, the electronic device 100 may set or change the number of input image sequences based on a user input.

Referring to FIG. 6, for example, the electronic device 100 may divide the original image data 601 having a reproduction time of 60 minutes into 60 image sequences 602 based on a predetermined unit time of 1 minute, and may determine ten image sequences arranged adjacent to each other in a reproduction time order among 60 image sequences as an input image group 603.

The electronic device 100 according to an embodiment may determine a predetermined number of image sequences from a second image sequence arranged adjacent to a first image sequence in a reproduction time order as a second input image group when the first image sequence among a plurality of image sequences included in a first input image group is added to a highlight image group.

As illustrated in FIG. 7, when a fifth image sequence c5 702 is determined as an image sequence to be generated as summary image data among input image sequences c1 to c10 determined as a first input image group 701, the electronic device 100 according to an embodiment may add the image sequence c5 702 as a highlight image group 703.

The 'highlight image group' according to an embodiment may refer to a set of image sequences determined by the processor to analyze each image sequence included in the input image group and to include the image sequence in the summary image data.

Referring to FIG. 7, when the fifth image sequence c5 702 is added to the highlight image group, the electronic device 100 according to an embodiment may determine ten image sequences c6 to c15 from an image sequence c6 704 arranged adjacent to the image sequence c5 702 in a reproduction time order as a second input image group 705.

When a seventh image sequence c12 706 is determined as an image sequence to be generated as summary image data among the input image sequences c6 to c15 determined as the second input image group 705, the electronic device 100 according to an embodiment may add the image sequence c12 706 as the highlight image group 703.

In operation S503 of FIG. 5, the electronic device 100 according to an embodiment may select one of image sequences included in an input image group and add the selected image sequence to a highlight image group based on one or more image sequences pre-classified as the highlight image group using a trained model trained using an artificial intelligence algorithm.

The electronic device 100 according to an embodiment may select an image sequence including an important scene most suitable for generating summary image data among the plurality of image sequences included in the input image group using a trained model trained to generate summary image data from input original image data.

The electronic device 100 may repeat a step of selecting one image sequence from each input image group multiple times to generate summary image data from one original image data. Accordingly, selected image sequences may be added to the highlight image group one by one.

For example, the electronic device 100 may calculate a score of each of the plurality of image sequences included in the input image group using a predetermined parameter calculated through a trained model trained using an artificial intelligence algorithm. The electronic device 100 may select an image sequence that is optimal for generating summary image data among the image sequences based on the calculated score.

When selecting an image sequence from the input image group, the electronic device 100 according to an embodiment may consider a correlation with an image sequence pre-classified as the highlight image group.

When there is an image sequence previously classified into the highlight image group, the electronic device 100 may calculate a score of a plurality of image sequences included in the input image group based on the image sequence included in the highlight image group. The electronic device 100 may select an image sequence to be added in the highlight image group based on a score in which a correlation with the image sequence previously classified into the highlight image group is considered.

Accordingly, an image sequence having a high correlation with the image sequence previously classified into the highlight image group may be selected.

Also, the electronic device 100 according to an embodiment may select one of image sequences included in the input image data group based on section information corresponding to each of the image sequences included in the input image data group. According to an embodiment, summary image data generated by the electronic device 100 selecting an image sequence based on the section information may be configured as a combination of relatively uniformly distributed image sequences based on the entire reproduction time flow of the original image data.

The 'section information' according to an embodiment may include information about a section to which each image sequence belongs among a plurality of sections into which the original image data is divided.

As illustrated in FIG. 8, for example, the electronic device 100 may divide original image data having a reproduction time of 60 minutes into four sections. The electronic device 100 may divide the original image data having a reproduction time of 60 minutes into equal time periods so that each section has an interval of 15 minutes.

For example, when there are 60 image sequences having a unit time of 1 minute, a first section (introduction) 801 may be a section including the image sequences of c1 to c15, a second section (development) 802 may be a section including the image sequence of c16 to c30, a third section (turn) 803 is a section including the image sequences of c31 to c45, and a fourth section (conclusion) 804 may be a section including an image sequence of c46 to c60.

According to an embodiment, the electronic device 100 may set or change the number of sections for dividing the original image data and the time point of each section. According to an embodiment, the electronic device 100 may divide the original image data based on the number of sections set as a default. Also, the electronic device 100 may divide the original image data based on time points of the sections set as a default. In addition, the electronic device 100 may set or change the number of sections and/or the time point of each section based on a user input.

According to an embodiment, the electronic device 100 may divide the original image data into n sections and generate section information indicating a section to which each image sequence belongs. For example, referring to FIG. 8, section information belonging to the first section (introduction) may be generated corresponding to the image sequences c1 to c15.

According to an embodiment, the electronic device 100 may select an image sequence to be added to a highlight group, based on section information corresponding to each image sequence.

Referring to FIG. 8, when the image sequence c8 is added to a highlight image group 807 from a first input image group, the electronic device 100 according to an embodiment may determine the image sequences c9 to c18 as a second input image group 809.

According to an embodiment, when the electronic device 100 is set to select a highlight image group at a uniform ratio for each section, the electronic device 100 may consider section information corresponding to each image sequence when selecting one of the image sequences included in the second input image group (c9 to c18) 809.

For example, because the image sequences c9 to c15 belong to the first section (introduction) 801 and the image sequence (c8) 806 belonging to the first section (introduction) 801 has already been selected as the highlight image group, the weight for the first section (introduction) 805 may be adjusted to be low. Accordingly, the weight for image sequences (c9 to c15) 808 belonging to the first section (introduction) among the second input image group (c9 to c18) 809 is adjusted to be low, so that the probability that the image sequences (c9 to c15) 808 are selected as the highlight image group may be lowered.

Meanwhile, according to an embodiment, unless the electronic device 100 is set to select the highlight image group at a uniform ratio for each section, the electronic device 100 may select an image sequence to be added to the highlight image group regardless of the section information.

In operation S504 of FIG. 5, the electronic device 100 according to an embodiment may generate summary image data extracted from the original image data by using the image sequence included in the highlight image group.

The electronic device 100 according to an embodiment may select an image sequence to be added to the highlight image group multiple times based on a target time.

According to an embodiment, the electronic device 100 may set or change a target time of summary image data. According to an embodiment, the electronic device 100 may generate summary image data based on a target time of summary image data set as a default. Also, the electronic device 100 may set or change the target time based on a user input.

For example, in order to generate original image data having a reproduction time of 60 minutes as summary image data having a target time of 5 minutes, the electronic device 100 may select an image sequence multiple times until 5 image sequences per minute are included in the highlight image group.

As illustrated in FIG. 9, the electronic device 100 according to an embodiment may generate summary image data 907 by combining image sequences (c5) 902, (c12) (903), (c29) 904, (c38) 905, and (c50) 906 included in a highlight image group 901.

FIGS. 10 to 14 are views for explaining an example of a user interface for receiving a user input related to generation of summary image data according to an embodiment. FIG. 15 is a view for explaining an example of displaying summary image data according to an embodiment.

The electronic device 100 according to an embodiment may display a user interface for generating summary image data on the display 110 (of FIG. 3) (hereinafter, the display 110).

Figure 10:
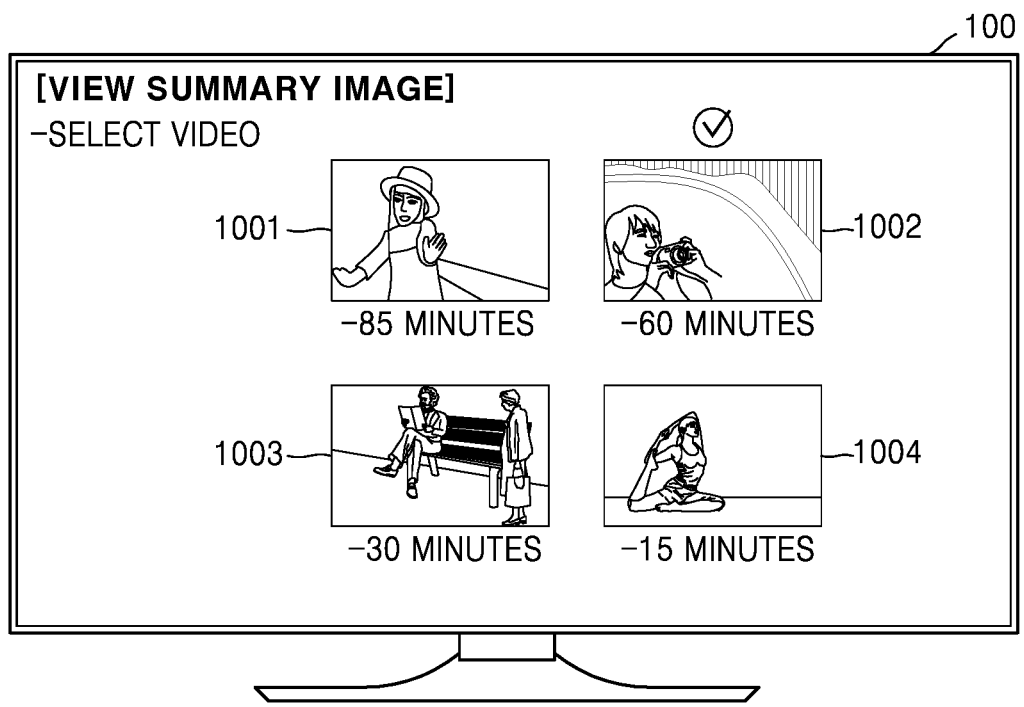
FIGS. 10, 11, 12, 13, and 14 are views for explaining an example of a user interface for receiving a user input related to generation of summary image data, according to an embodiment.

Referring to FIG. 10, the electronic device 100 may display thumbnail images 1001, 1002, 1003, and 1004 corresponding to one or more image data on the display 110.

According to an embodiment, the electronic device 100 may display image data stored in the memory 120 (of FIGS. 2 and 3) on the display 110. Also, the electronic device 100 may display image data stored in a memory of an external device (not shown) connected to the electronic device 100 on the display 110. Also, the electronic device 100 may display downloadable image data on the web on the display 110.

According to an embodiment, the electronic device 100 may receive a user input for selecting any one 1002 of the displayed image data. The electronic device 100 may determine the image data 1002 selected based on the user input as original image data to generate summary image data.

Meanwhile, according to an embodiment, the electronic device 100 may receive a user input through a control device 400. The control device 400 according to an embodiment may be implemented as various types of devices for controlling the electronic device 100 such as a remote control or a mobile phone.

Alternatively, when the electronic device 100 includes a display and the display is a touch screen, the control device 400 may be a user's finger, an input pen, or the like.

In addition, the control device 400 may control the electronic device 100 via short-range communication such as infrared communication or Bluetooth. The control device 400 may control functions of the electronic device 100 using at least one of a key (including a button), a touch pad, a microphone (not shown) capable of receiving a user's audio signal, and a sensor (not shown) capable of detection motion of the control device 400, which are all provided in the control device 400.

The control device 400 may include a power on/off button for turning on or off the electronic device 100. The control device 400 may change channels of the electronic device 100, adjust a volume, select a terrestrial broadcast/cable broadcast/satellite broadcast, or set an environment by a user input.

Also, the control device 400 may be a pointing device. For example, the control device 400 may operate as a pointing device when receiving a specific key input.

Figure 11:
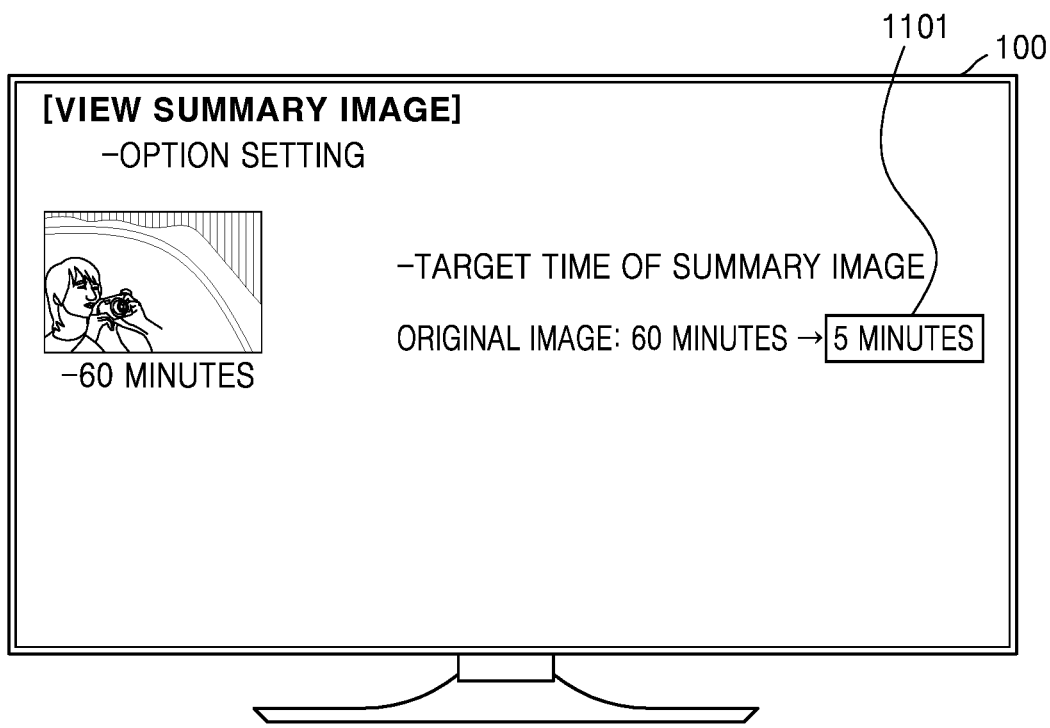

Referring to FIG. 11, according to an embodiment, the electronic device 100 may set or change a target time based on a user input.

For example, the electronic device 100 may display a user interface for requesting a user input regarding whether to generate a summary video having a reproduction time of several minutes by using original image data having a reproduction time of 60 minutes. The electronic device 100 may receive a user input for entering a target time 1101 (e.g., 5 minutes). Accordingly, the electronic device 100 may set a target time of summary image data to 5 minutes.

Figure 12:
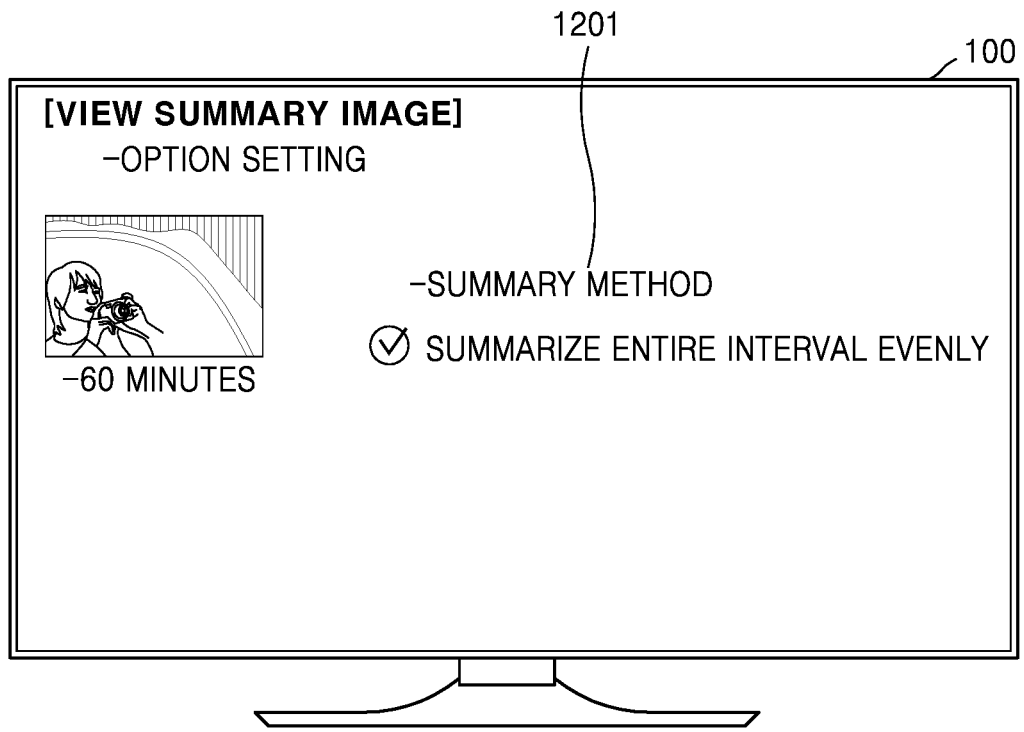

Referring to FIG. 12, according to an embodiment, the electronic device 100 may set or change an option as to whether to select a summary image sequence evenly over the entire section of original image data based on a user input.

For example, assuming that original image data with a reproduction time of 60 minutes is divided into n (e.g., 4) sections, the electronic device 100 may display a user interface for requesting a user input regarding whether to select a highlight image group as evenly as possible in each section.

For example, the electronic device 100 may receive a user input 1201 for selecting to equally summarize the entire section. Accordingly, the electronic device 100 may select a highlight image group considering section information corresponding to each image sequence.

Figure 13:
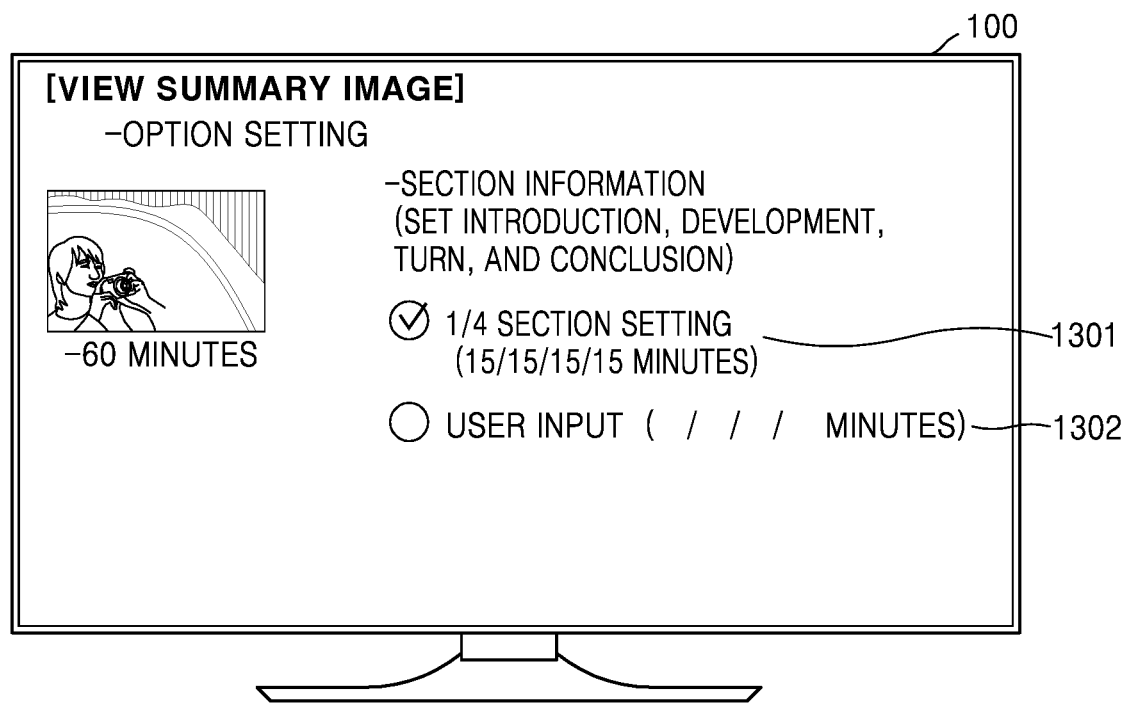

Referring to FIG. 13, according to an embodiment, the electronic device 100 may set or change an option for section information based on a user input.

For example, assuming that original image data is divided into n sections (e.g., four), the electronic device 100 may display a user interface 1301 for requesting a user input regarding whether to configure sections of 15 minutes each at an equal rate.

Also, the electronic device 100 may display a user interface 1302 requesting a user input for dividing a section by a ratio directly input by a user. For example, the electronic device 100 may divide the original image data into a ratio of 10 minutes, 20 minutes, 20 minutes, and 10 minutes based on a user input.

Figure 14:
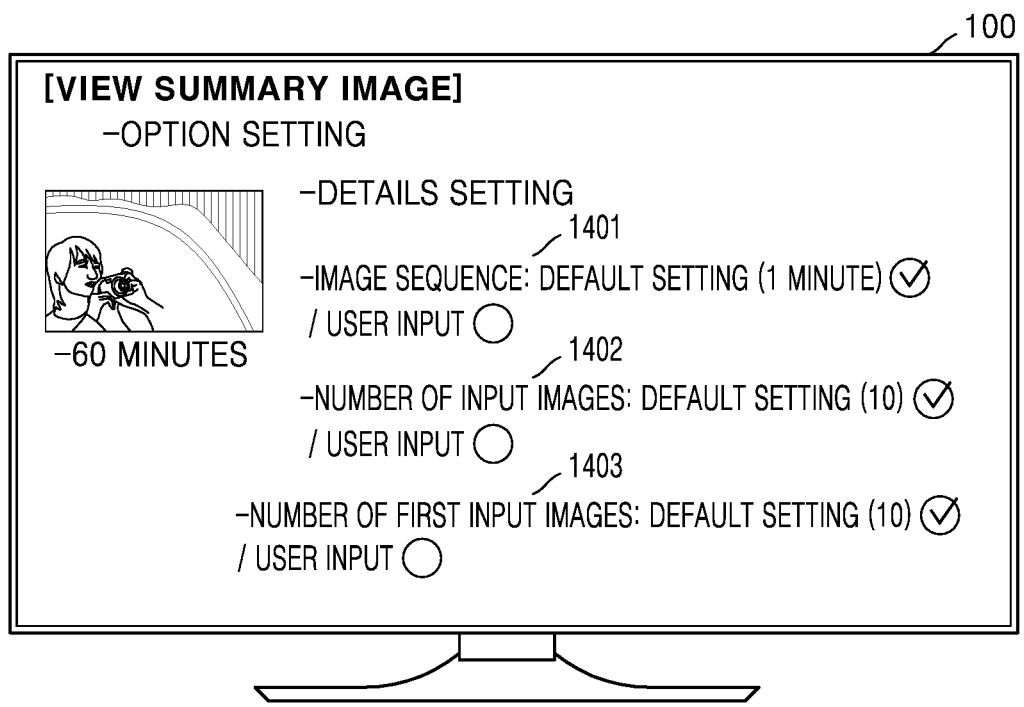
Figure 15:
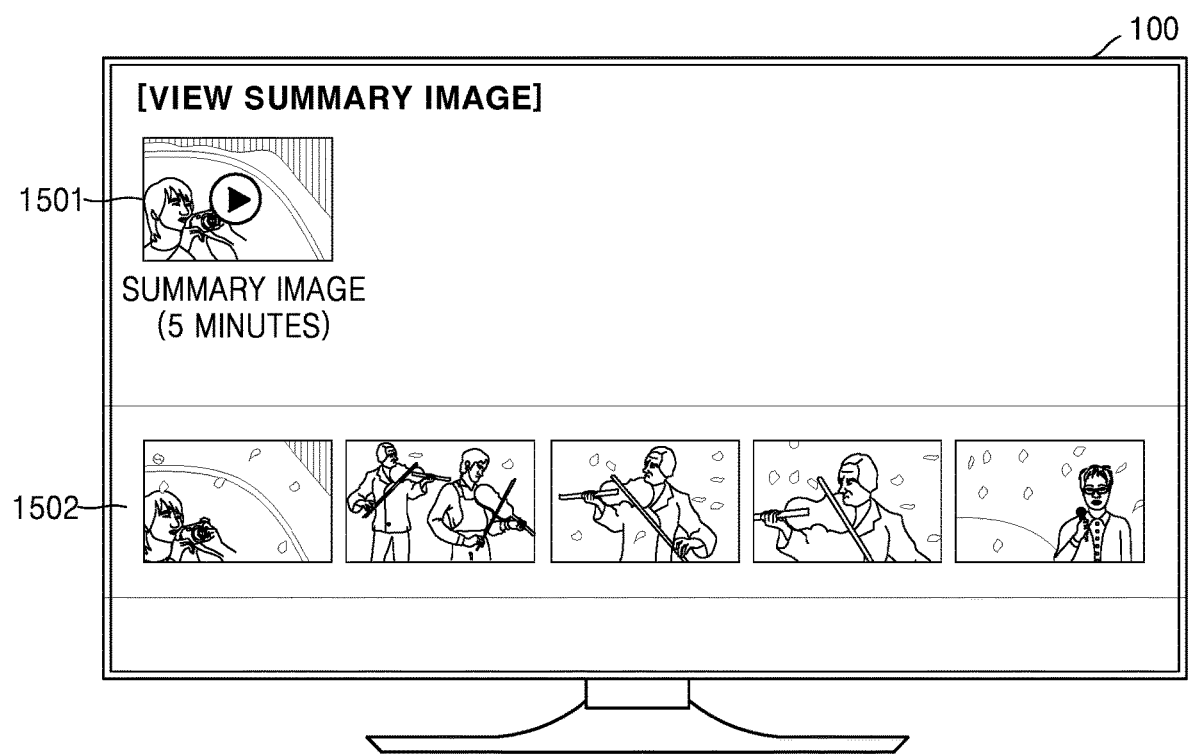
FIG. 15 is a view for explaining an example of displaying summary image data, according to an embodiment.

Referring to FIG. 14, according to an embodiment, the electronic device 100 may set or change a unit time of an image sequence based on a user input.

For example, the electronic device 100 may display a user selection input regarding whether to divide original image data into an image sequence of 1 minute unit time or a user interface 1401 requesting a user to directly input a unit time.

Also, according to an embodiment, the electronic device 100 may set or change the number of input image sequences to be included in an input image group based on a user input.

For example, the electronic device 100 may display a user selection input regarding whether to include 10 image sequences for each input image group or a user interface 1402 requesting a user to directly input the number of input image sequences.

Also, according to an embodiment, the electronic device 100 may set or change the number of input image sequences to be included in a first input image group based on a user input.

According to an embodiment, when performing the step of selecting an image sequence to be included in the highlight image group multiple times, the electronic device 100 may set or change the number of input image sequences to be included in the first input image group.

According to an embodiment, because a first image sequence to be generated as summary image data is selected from the first input image group, an input sequence having higher importance may be selected for a larger number of input image sequences.

For example, the electronic device 100 may display a user selection input regarding whether to include 10 image sequences in the first input image group or a user interface 1403 requesting a user to directly input the number of first input image sequences.

As illustrated in FIG. 15, the electronic device 100 according to an embodiment may display an image 1501 captured from generated summary image data on the display 110.

According to an embodiment, the electronic device 100 may reproduce summary image data based on a user input.

In addition, the electronic device 100 according to an embodiment may control the display 110 to generate a captured image for each of a plurality of image sequences constituting the summary image data and display each captured image in a thumbnail format.

Referring to FIG. 15, for example, five thumbnail images 1502 may be displayed.

FIGS. 10 to 15 illustrate an embodiment, but are not limited thereto.

Figure 16:
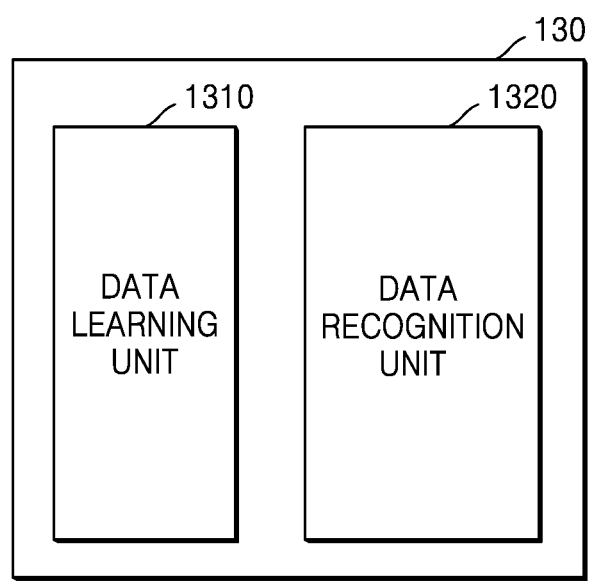
FIG. 16 is a block diagram of a processor according to an embodiment.

FIG. 16 is a block diagram of the processor 130 according to some embodiments.

The processor 130 of FIG. 16 may be an example of the processor 130 of FIGS. 2 and 3.

The processor 130a is not limited to a data learning unit 1310 and a data recognition unit 1320 shown as components of the block diagram, and may be integrated, added, or omitted according to specifications of the electronic device 100 that is actually implemented. For example, if necessary, two or more components may be combined into one component, or one component may be divided into two or more components. Also, some components may be implemented as an external device (not shown) connectable to the electronic device 100.

Referring to FIG. 16, the image processing device 130 according to some embodiments may include a data learning unit 1310 and a data recognition unit 1320.

The data learning unit 1310 may learn a criterion for determining a situation. The data learning unit 1310 may learn a criterion for determining what data to use to determine a predetermined situation and how to determine the situation using the data. The data learning unit 1310 may learn a criterion for determining a situation by obtaining data to be used for learning and applying the obtained data to a data recognition model to be described later below.

The data recognition unit 1320 may determine a situation based on data. The data recognition unit 1320 may recognize a situation from predetermined data using a trained data recognition model. The data recognition unit 1320 may obtain predetermined data according to a preset criterion by learning, and may determine a predetermined situation based on the predetermined data by using the data recognition model using the obtained data as an input value. Further, a resultant value output by the data recognition model with the obtained data as the input value may be used to update the data recognition model.

At least one of the data learning unit 1310 and the data recognition unit 1320 may be manufactured in the form of at least one hardware chip and mounted on the electronic device. For example, at least one of the data learning unit 1310 and the data recognition unit 1320 may be manufactured in the form of a dedicated hardware chip for artificial intelligence (AI) or may be manufactured as a portion of a conventional general-purpose processor (e.g., a central processing unit (CPU) or an application processor) or a graphics-dedicated processor (e.g., a GPU) to be mounted on the various electronic devices as described above.

In this case, the data learning unit 1310 and the data recognition unit 1320 may be mounted on one electronic device or on separate electronic devices, respectively. For example, one of the data learning unit 1310 and the data recognition unit 1320 may be included in the electronic device and the other one may be included in the server. Furthermore, the data learning unit 1310 and the data recognition unit 1320 may provide model information constructed by the data learning unit 1310 to the data recognition unit 1320 in a wired or wireless manner, and data input to the data recognition unit 1320 may be provided to the data learning unit 1310 as additional training data.

Meanwhile, at least one of the data learning unit 1310 and the data recognition unit 1320 may be implemented as a software module. When at least one of the data learning unit 1310 and the data recognition unit 1320 is implemented as a software module (or a program module including instructions), the software module may be stored in a non-transitory computer-readable recording medium. Alternatively, at least one software module may be provided by an operating system (OS) or a certain application. Alternatively, some of the at least one software module may be provided by the OS, and some of the remaining may be provided by a certain application.

Figure 17:
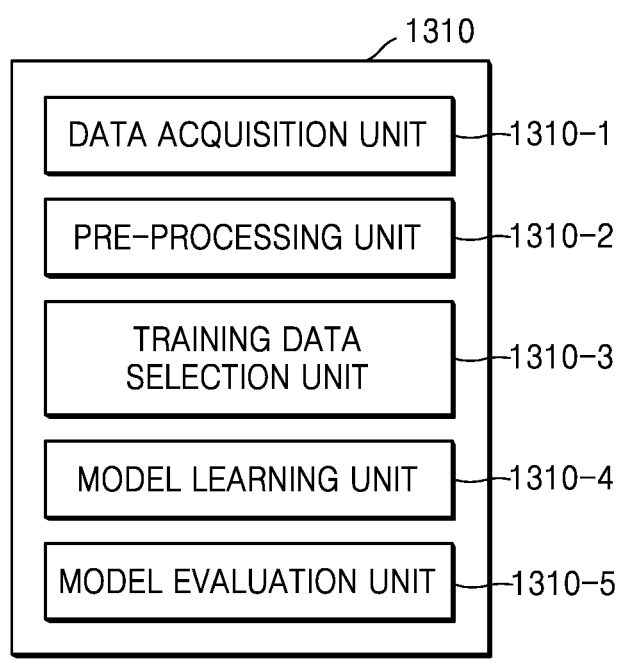
FIG. 17 is a block diagram of a data learning unit according to an embodiment.

FIG. 17 is a block diagram of a data learning unit according to an embodiment.

Referring to FIG. 17, the data learning unit 1310 according to some embodiments may include a data acquisition unit 1310-1, a pre-processing unit 1310-2, a training data selection unit 1310-3, a model learning unit 1310-4, and a model evaluation unit 1310-5.

The data acquisition unit 1310-1 may obtain data necessary for determining a situation. The data acquisition unit 1310-1 may obtain data necessary for learning to determine a situation.

According to an embodiment, the data acquisition unit 1310-1 may obtain data about original image data and summary image data. For example, the data acquisition unit 1310-1 may receive original image data and data about a summary image data set produced by human or a predetermined algorithm.

Alternatively, the data acquisition unit 1310-1 may obtain data through an external device that communicates with an electronic device.

According to an embodiment, image data may be composed of a plurality of images (or frames). For example, the data acquisition unit 1310-1 may receive a video through a camera of an electronic device including the data learning unit 1310 or an external camera (e.g., CCTV or black box) capable of communicating with an electronic device including the data learning unit 1310.

The camera may include at least one image sensor (e.g., front sensor, or rear sensor), a lens, an image signal processor (ISP), or a flash (e.g., LED or xenon lamp, etc.).

The pre-processing unit 1310-2 may pre-process obtained data so that the obtained data may be used for learning to determine a situation. The pre-processing unit 1310-2 may process the obtained data into a preset format such that the model learning unit 1310-4, which will be described later below, may use the obtained data for learning to determine a situation. For example, the pre-processing unit 1310-2, based on a common area included in each of a plurality of images (or frames) constituting at least a portion of an input video, may generate one composite image by overlapping at least some of the plurality of images. In this case, a plurality of composite images may be generated from one video. The common area may be an area including the same or similar common object in each of a plurality of images (e.g., objects, animals, plants, or people). Alternatively, the common area may be an area in which colors, shades, RGB values, or CMYK values are the same or similar in each of the plurality of images.

The training data selection unit 1310-3 may select data necessary for learning from the pre-processed data. The selected data may be provided to the model learning unit 1310-4. The training data selection unit 1310-3 may select data necessary for learning from the pre-processed data according to a preset criterion for situation determination. The training data selection unit 1310-3 may also select data according to the preset criterion by learning by the model learning unit 1310-4, which will be described later below.

The model learning unit 1310-4 may learn a criterion for how to determine a situation based on training data. In addition, the model learning unit 1310-4 may learn a criterion on which training data should be used to determine a situation.

In addition, the model learning unit 1310-4 may train a data recognition model used to determine a situation by using training data. In this case, the data recognition model may be a pre-built model. For example, the data recognition model may be a pre-built model that receives basic training data (e.g., a sample image, etc.).

The data recognition model may be built considering an application field of the recognition model, the purpose of learning, or the computer performance of a device. The data recognition model may be, for example, a model based on a neural network. For example, models such as Deep Neural Network (DNN), Recurrent Neural Network (RNN), and Bidirectional Recurrent Deep Neural Network (BRDNN) may be used as the data recognition model, but the present disclosure is not limited thereto.

According to various embodiments, when there are a plurality of data recognition models that are built in advance, the model learning unit 1310-4 may determine a data recognition model that is highly relevant to input training data and the basic training data as a data recognition model to be trained. In this case, the basic training data may be pre-classified for each type of data, and the data recognition model may be pre-built for each type of data. For example, the basic training data may be pre-classified based on various criteria such as an area where the training data is generated, time at which the training data is generated, a size of the training data, a genre of the training data, a creator of the training data, the type of an object in the training data, and the like.

In addition, the model learning unit 1310-4 may train the data recognition model by using, for example, a learning algorithm including error back-propagation or gradient descent.

Also, the model learning unit 1310-4 may train the data recognition model through, for example, supervised learning using training data as an input value. The model learning unit 1310-4 may also train the data recognition model through unsupervised learning that finds a criterion for situation determination by self-learning, for example, the type of data necessary to determine a situation without any guidance. Further, the model learning unit 1310-4 may train the data recognition model through reinforcement learning using, for example, feedback on whether results of situation determination based on the learning is correct.

Further, when the data recognition model is trained, the model learning unit 1310-4 may store the trained data recognition model. In this case, the model learning unit 1310-4 may store the trained data recognition model in a memory of an electronic device including the data recognition unit 1320. Alternatively, the model learning unit 1310-4 may store the trained data recognition model in the memory of the electronic device including the data recognition unit 1320 to be described later below. Alternatively, the model learning unit 1310-4 may store the trained data recognition model in a memory of a server connected to an electronic device via a wired or wireless network.

In this case, the memory in which the trained data recognition model is stored may store, for example, commands or data related to at least one other component of an electronic device together. The memory may also store software and/or a program. The program may include, for example, a kernel, middleware, an application programming interface (API) and/or an application program (or "application"), or the like.

The model evaluation unit 1310-5 inputs the evaluation data to the data recognition model. When a recognition result output from the evaluation data does not satisfy a certain criterion, the model evaluation unit 1310-5 may allow the model learning unit 1310-4 to learn again. In this case, the evaluation data may be preset data for evaluating the data recognition model.

For example, among recognition results of trained data recognition model for the evaluation data, when the number or the ratio of evaluation data whose recognition result is not correct exceeds a preset threshold value, the model evaluation unit 1310-5 may evaluate that the data recognition model does not satisfy the certain criterion. For example, when the certain criterion is defined as a ratio of 2%, and when the trained data recognition model outputs an incorrect recognition result for evaluation data exceeding 20 out of a total of 1000 evaluation data, the model evaluation unit 1310-5 may evaluate that the trained data recognition model is inappropriate.

Meanwhile, when there are a plurality of trained data recognition models, the model evaluation unit 1310-5 may evaluate whether each of trained video recognition models satisfies a certain criterion, and may determine a model that satisfies the certain criterion as a final data recognition model. In this case, when there are a plurality of models satisfying the certain criterion, the model evaluation unit 1310-5 may determine any one or a certain number of models preset in the order of higher evaluation scores as a final data recognition model.

Meanwhile, at least one of the data acquisition unit 1310-1, the pre-processing unit 1310-2, the training data selection unit 1310-3, the model learning unit 1310-4, and the model evaluation unit 1310-5 in the data learning unit 1310 may be manufactured in the form of at least one hardware chip and mounted on the electronic device. For example, at least one of the data acquisition unit 1310-1, the pre-processing unit 1310-2, the training data selection unit 1310-3, the model learning unit 1310-4, and the model evaluation unit 1310-5 may be manufactured in the form of a dedicated hardware chip for AI or may be manufactured as a portion of a conventional general-purpose processor (e.g., a CPU or an application processor) or a graphics-dedicated processor (e.g., a GPU) to be mounted on the various electronic devices as described above.

Furthermore, the data acquisition unit 1310-1, the pre-processing unit 1310-2, the training data selection unit 1310-3, the model learning unit 1310-4, and the model evaluation unit 1310-5 may be mounted on one electronic device or may be mounted on separate electronic devices, respectively. For example, some of the data acquisition unit 1310-1, the pre-processing unit 1310-2, the training data selection unit 1310-3, the model learning unit 1310-4, and the model evaluation unit 1310-5 may be included in an electronic device and some of the remaining may be included in a server.

Furthermore, at least one of the data acquisition unit 1310-1, the pre-processing unit 1310-2, the training data selection unit 1310-3, the model learning unit 1310-4, and the model evaluation unit 1310-5 may be implemented as a software module. When at least one of the data acquisition unit 1310-1, the pre-processing unit 1310-2, the training data selection unit 1310-3, the model learning unit 1310-4, and the model evaluation unit 1310-5 is implemented as a software module (or a program module including instructions), the software module may be stored in a non-transitory computer-readable recording medium. Alternatively, at least one software module may be provided by an operating system (OS) or a certain application. Alternatively, some of the at least one software module may be provided by the OS, and some of the remaining may be provided by a certain application.

Figure 18:
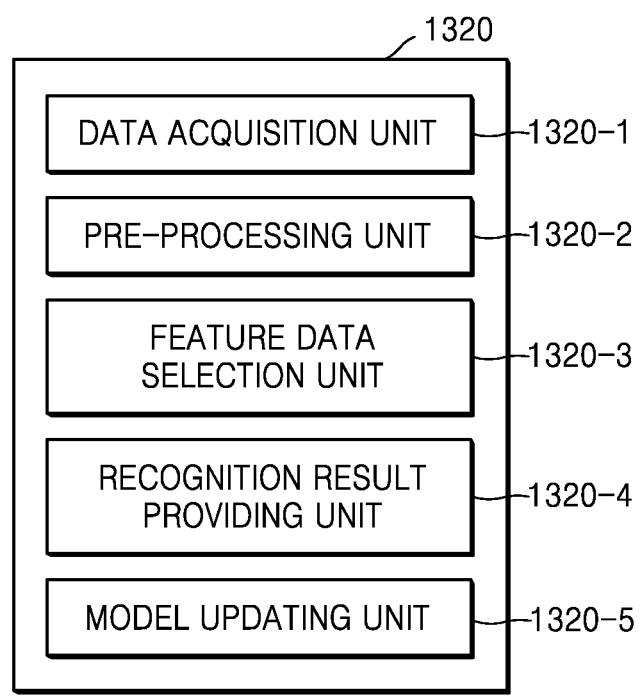
FIG. 18 is a block diagram of a data recognition unit according to an embodiment.

FIG. 18 is a block diagram of a data recognition unit according to an embodiment.

Referring to FIG. 18, the data recognition unit 1320 according to some embodiments may include a data acquisition unit 1320-1, a pre-processing unit 1320-2, a feature data selection unit 1320-3, a recognition result providing unit 1320-4, and a model updating unit 1320-5.

The data acquisition unit 1320-1 may obtain data necessary for situation determination, and the preprocessor 1320-2 may pre-process the obtained data so that the data obtained for situation determination may be used. The pre-processing unit 1320-2 may process the obtained data into a preset format so that the recognition result providing unit 1320-4, which will be described later below, may use the obtained data for situation determination.

The feature data selection unit 1320-3 may select data necessary to determine a situation from pre-processed data. The selected data may be provided to the recognition result providing unit 1320-4. The feature data selection unit 1320-3 may select some or all of the pre-processed data according to a preset criterion for situation determination. Also, the feature data selection unit 1320-3 may also select data according to the preset criterion by learning by the model learning unit 1310-4, which will be described later below.

The recognition result providing unit 1320-4 may determine a situation by applying the selected data to a data recognition model. The recognition result providing unit 1320-4 may provide a recognition result according to a data recognition purpose. The recognition result providing unit 1320-4 may apply the selected data to the data recognition model by using the data selected by the feature data selection unit 1320-3 as an input value. In addition, the recognition result may be determined by the data recognition model.

The model updating unit 1320-5 may update the data recognition model based on an evaluation of the recognition result provided by the recognition result providing unit 1320-4. For example, the model updating unit 1320-5 provides the recognition result provided by the recognition result providing unit 1320-4 to the model learning unit 1310-4 so that the model learning unit 1310-4 may update the data recognition model.

Meanwhile, at least one of the data acquisition unit 1320-1, the preprocessing unit 1320-2, the feature data selection unit 1320-3, the recognition result providing unit 1320-4, and the model updating unit 1320-5 in the data recognition unit 1320 may be manufactured in the form of at least one hardware chip and mounted on the electronic device. For example, at least one of the data acquisition unit 1320-1, the pre-processing unit 1320-2, the feature data selection unit 1320-3, the recognition result providing unit 1320-4, and the model updating unit 1320-5 may be manufactured in the form of a dedicated hardware chip for AI or may be manufactured as a portion of a conventional general-purpose processor (e.g., a CPU or an application processor) or a graphics-dedicated processor (e.g., a GPU) to be mounted on the various electronic devices as described above.

Furthermore, the data acquisition unit 1310-1, the pre-processing unit 1310-2, the feature data selection unit 1320-3, the recognition result providing unit 1320-4, and the model updating unit 1320-5 may be mounted on one electronic device or may be mounted on separate electronic devices, respectively. For example, some of the data acquisition unit 1320-1, the preprocessing unit 1320-2, the feature data selection unit 1320-3, the recognition result providing unit 1320-4, and the model updating unit 1320-5 may be included in an electronic device and some of the remaining may be included in a server.

Furthermore, at least one of the data acquisition unit 1320-1, the preprocessing unit 1320-2, the feature data selection unit 1320-3, the recognition result providing unit 1320-4, and the model updating unit 1320-5 may be implemented as a software module. When at least one of the data acquisition unit 1320-1, the preprocessing unit 1320-2, the feature data selection unit 1320-3, the recognition result providing unit 1320-4, and the model updating unit 1320-5 is implemented as a software module (or a program module including instructions), the software module may be stored in a non-transitory computer-readable recording medium. Alternatively, at least one software module may be provided by an operating system (OS) or a certain application. Alternatively, some of the at least one software module may be provided by the OS, and some of the remaining may be provided by a certain application.

Figure 19:
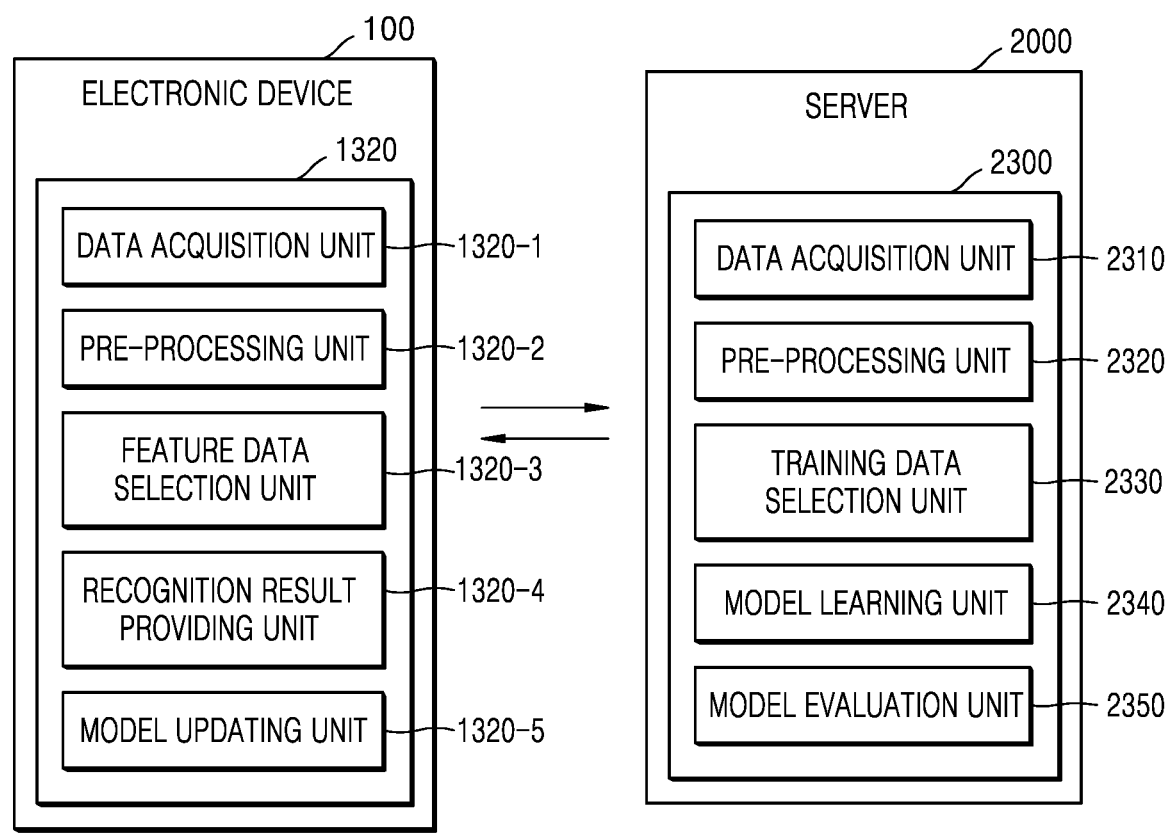
FIG. 19 is a view illustrating an example of learning and recognizing data by interlocking an electronic device and a server, according to an embodiment.

FIG. 19 is a view illustrating an example of learning and recognizing data by interlocking an electronic device and a server according to an embodiment.

FIG. 19 is a view of an example in which the electronic device 100 and the server 2000 according to some embodiments interlock with each other to learn and recognize data.

Referring to FIG. 19, the server 2000 may learn a criterion for situation determination, and the electronic device 100 may determine a situation based on a result of learning by the server 2000.

In this case, a model learning unit 2340 of the server 2000 may perform the function of the data learning unit 1310 shown in FIG. 17. The model learning unit 2340 of the server 2000 may learn what data to use to determine a predetermined situation and how to determine the situation using data. The data learning unit 2340 may learn a criterion for determining a situation by obtaining data to be used for learning and applying the obtained data to a data recognition model to be described later below.

Also, the recognition result providing unit 1320-4 of the electronic device 100 may determine a situation by applying data selected by the feature data selection unit 1320-3 to a data recognition model generated by the server 2000. For example, the recognition result providing unit 1320-4 may transmit the data selected by the feature data selection unit 1320-3 to the server 2000, and may request the server 2000 to apply the data selected by the feature data selection unit 1320-3 to a data recognition model for situation determination. Furthermore, the recognition result providing unit 1320-4 may receive information on the situation determined by the server 2000 from the server 2000.

Alternatively, the recognition result providing unit 1320-4 of the electronic device 100 may receive a data recognition model generated by the server 2000 from the server 2000, and may determine a situation using the received data recognition model. In this case, the recognition result providing unit 1320-4 of the electronic device 100 may determine a situation by applying the data selected by the feature data selection unit 1320-3 to the data recognition model received from the server 2000.

The device described herein may include a processor, a memory for storing program data and executing it, a permanent storage such as a disk drive, a communication port for handling communication with external devices, and user interface devices including a touch panel, keys, buttons, etc. When software modules or algorithms are involved, these software modules may be stored as program instructions or computer-readable code executable on a processor on a computer-readable recording medium. Examples of the computer-readable recording medium include magnetic storage media (e.g., ROM, RAM, floppy disks, hard disks, etc.), and optical recording media (e.g., CD-ROMs, digital versatile disks (DVDs), etc.). The computer-readable recording medium can also be distributed over network-coupled computer systems so that the computer-readable code is stored and executed in a distributive manner. This media can be read by the computer, stored in the memory, and executed by the processor.

The present disclosure may be illustrated by functional block formations and various processing operations. Such functional blocks may be realized by a multiple number of hardware configurations performing particular functions and/or software configurations. For example, the present disclosure may adopt IC formations such as memory, processors, logic units and look-up tables, which can perform various functions by controlling more than one microprocessor or by other control systems. Similar to formation elements being capable of being executable by software programming or software factors, the present embodiment may be realized by programming or scripting languages such as C, C++, Java and assembler, including various algorithms realized by a combination of data structures, processes, routines or other programming formations. Functional aspects may be realized by algorithms executed in more than one processor. In addition, the present disclosure may adopt related-art technology for electronic environment set-up, signal processing, and/or data processing, etc. Terms such as "mechanism", "element", "means", and "formation" may be widely used, and not limited to mechanical and physical formations. The terms above may include meanings of series of routines of software related to a processor, etc.

The particular implementations described herein are only examples and are not intended to otherwise limit the scope of the present disclosure in any way. For the sake of brevity, conventional electronics, control systems, software development and other functional aspects of the systems may not be described in detail.

The above description of the present disclosure is for illustrative purposes, and thus, it will be understood by one of ordinary skill in the art that various changes in form and details may be made therein without departing from the spirit and scope of the present disclosure. Therefore, the embodiments should be considered in descriptive sense only and not for purposes of limitation. For example, each constituent element that is described as a singular form may be embodied in distribution forms. Also, constituent elements that are described in distribution forms may be embodied in a combined form.

The use of any and all examples, or exemplary language provided herein, is intended merely to better illuminate the present disclosure and does not pose a limitation on the scope of the present disclosure unless otherwise claimed.

Moreover, unless there is a specific reference, such as "essential" or "critical," the elements described in the present disclosure may not be necessary elements for the implementation of the present disclosure.

One of ordinary skill in the art related to the embodiments of the present disclosure will appreciate that the present disclosure may be implemented in a modified form without departing from the essential characteristics of the description.

The present disclosure is not limited by the specific embodiments described in the specification because various transformations can be applied and various embodiments can be applied. It should be understood that all conversions, equivalents, and substitutes included in the spirit and scope of the present disclosure are included in the present disclosure. It should be understood that embodiments described herein should be considered in a descriptive sense only and not for purposes of limitation.

The scope of the present disclosure is indicated by the claims rather than the detailed description of the invention, and all changes or modified forms derived from the meaning and scope of the claims and the concept of equivalents thereof should be interpreted as being included in the scope of the present disclosure.

In addition, terms such as " . . . unit", " . . . module", or the like described herein refer to units that perform at least one function or operation, and the units may be implemented as hardware or software or as a combination of hardware and software.

The "unit" and "module" may be implemented by a program stored in a storage medium that may be addressed and executed by a processor.

Accordingly, the "unit" and "module" may be implemented by software components, object-oriented software components, components such as class components and task components, processors, formulas, attributes, procedures, subroutines, segments of program codes, drivers, firmware, micro codes, circuits, data, database, data structures, tables, arrays, and variables.

In the present specification, the description of "A may include one of a1, a2, and a3" has a broad meaning that an exemplary element that may be included in element A is a1, a2, or a3.

Even with the above description, the elements that can constitute element A are not necessarily limited to a1, a2, or a3. Therefore, it should be noted that the elements constituting A are not interpreted exclusively in the sense of excluding other elements not illustrated other than a1, a2, and a3.

In addition, the description means that A may include a1, a2, or a3. The above description does not mean that the elements constituting A are necessarily selectively determined within a predetermined set. For example, it should be noted that the above description is not limitedly interpreted as constituting component A by a1, a2, or a3 selected from a set including a1, a2, and a3.

In addition, in the present specification, the description of "at least one of a1, a2, and a3" represents one of "a1," "a2," "a3," "a1 and a2," "a1 and a3," "a2 and a3," and "a1, a2, and a3." Therefore, unless explicitly stated as "at least one of a1, at least one of a2, and at least one of a3," it should be noted that the description of "at least one of a1, a2 and a3" is not interpreted as "at least one of a1," "at least one of a2," and "at least one of a3."

What is claimed is:

1. An electronic device, comprising:
a memory storing one or more instructions; and
a processor executing the one or more instructions stored in the memory,
wherein the processor is configured to execute the one or more instructions to:
obtain a plurality of image sequences divided from original image data;
determine a predetermined number of image sequences among the plurality of image sequences as a first input image group;
based on a correlation with one or more image sequences pre-classified as a highlight image group, select a first image sequence among the image sequences included in the first input image group and add the selected first image sequence to a highlight image group;
determine the predetermined number of image sequences from a next image sequence arranged adjacent to the selected first image sequence in a reproduction time order as a second input image group;
based on a correlation with the image sequences including the first image sequence pre-classified as the highlight image group, select a second image sequence among the image sequences included in the second input image group;
add the selected second image sequence to the highlight image group; and
generate summary image data extracted from the original image data, by using image sequences included in the highlight image group.

2. The electronic device of claim 1, wherein the processor is further configured to execute the one or more instructions to:
select the first image sequence included in the first input image group based on section information corresponding to each of the image sequences included in the first input image group,
wherein the section information comprises information about a section to which each image sequence belongs among a plurality of sections into which the original image data is divided.

3. The electronic device of claim 1, wherein the processor is further configured to execute the one or more instructions to:
divide the original image data into the plurality of image sequences based on a predetermined time unit; and
determine the predetermined number of image sequences arranged adjacent to each other in a reproduction time order among the plurality of divided image sequences as the first input image group.

4. The electronic device of claim 1, wherein the processor is further configured to execute the one or more instructions to determine a target time of the summary image data based on a user input.

5. The electronic device of claim 4, wherein the processor is further configured to execute the instructions to select an image sequence to be added to the highlight image group multiple times based on the target time.

6. The electronic device of claim 1, wherein the processor is further configured to execute the one or more instructions to control a display to display the generated summary image data as a thumbnail image.

7. An operation method of an electronic device, the operation method comprising:
obtaining a plurality of image sequences divided from original image data;
determining a predetermined number of image sequences among the plurality of image sequences as a first input image group;
based on a correlation with one or more image sequences pre-classified as a highlight image group, selecting a first image sequence among the image sequences included in the first input image group and adding the selected first image sequence to a highlight image group;
determining the predetermined number of image sequences from a next image sequence arranged adjacent to the selected first image sequence in a reproduction time order as a second input image group;
based on a correlation with the image sequences including the first image sequence pre-classified as the highlight image group, selecting a second image sequence among the image sequences included in the second input image group;
adding the selected second image sequence to the highlight image group; and generating summary image data extracted from the original image data, by using image sequences included in the highlight image group.

8. The operation method of claim 7, wherein the adding of the selected first image sequence to the highlight image group comprises:
selecting the first image sequence included in the first input image group based on section information corresponding to each of the image sequences included in the first input image group,
wherein the section information comprises information about a section to which each image sequence belongs among a plurality of sections into which the original image data is divided.

9. The operation method of claim 7, wherein the determining of the predetermined number of image sequences as the first input image group comprises:
dividing the original image data into the plurality of image sequences based on a predetermined time unit; and
determine the predetermined number of image sequences arranged adjacent to each other in a reproduction time order among the plurality of divided image sequences as the first input image group.

10. The operation method of claim 7, further comprising determining a target time of the summary image data based on a user input.

11. The operation method of claim 10, wherein the adding of the selected first image sequence and the selected second image sequence to the highlight image group comprises selecting an image sequence to be added to the highlight image group multiple times based on the target time.

12. The operation method of claim 7, further comprising controlling a display to display the generated summary image data as a thumbnail image.

13. A non-transitory computer-readable recording medium having recorded thereon a program which, when executed by a computer, causes the computer to control an electronic apparatus to perform operations comprising:

obtaining a plurality of image sequences divided from original image data;

determining a predetermined number of image sequences among the plurality of image sequences as a first input image group;

based on a correlation with one or more image sequences pre-classified as a highlight image group, selecting a first image sequence among the image sequences included in the first input image group and adding the selected first image sequence to a highlight image group;

determining the predetermined number of image sequences from a next image sequence arranged adjacent to the selected first image sequence in a reproduction time order as a second input image group;

based on a correlation with the image sequences including the first image sequence pre-classified as the highlight image group, selecting a second image sequence among the image sequences included in the second input image group;

adding the selected second image sequence to the highlight image group; and generating summary image data extracted from the original image data, by using image sequences included in the highlight image group.

\* \* \* \* \*